(12) United States Patent
Yoshikawa et al.

(10) Patent No.: US 8,047,076 B2
(45) Date of Patent: Nov. 1, 2011

(54) ACCELERATION SENSOR AND METHOD OF FABRICATING IT

(75) Inventors: Yasuhiro Yoshikawa, Kyoto (JP); Hiroyuki Tajiri, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 382 days.

(21) Appl. No.: 12/444,426

(22) PCT Filed: May 16, 2008

(86) PCT No.: PCT/JP2008/059034
§ 371 (c)(1), (2), (4) Date: Apr. 6, 2009

(87) PCT Pub. No.: WO2008/146624
PCT Pub. Date: Dec. 4, 2008

(65) Prior Publication Data
US 2010/0000324 A1    Jan. 7, 2010

(30) Foreign Application Priority Data

May 30, 2007 (JP) ................................. 2007-143571
May 30, 2007 (JP) ................................. 2007-143576

(51) Int. Cl.
*G01P 15/125* (2006.01)
*H05K 3/30* (2006.01)
*H01L 29/82* (2006.01)

(52) U.S. Cl. .................... 73/514.32; 73/514.34; 257/43; 257/417; 29/837

(58) Field of Classification Search .......................... None
See application file for complete search history.

(56) References Cited

U.S. PATENT DOCUMENTS

| | | | | |
|---|---|---|---|---|
| 5,490,422 | A | * | 2/1996 | Tabota et al. .............. 73/514.34 |
| 6,148,671 | A | * | 11/2000 | Nakamizo et al. .......... 73/514.34 |
| 6,448,624 | B1 | * | 9/2002 | Ishio et al. .................... 257/417 |
| 2004/0239341 | A1 | | 12/2004 | Aoyagi et al. |
| 2010/0117075 | A1 | * | 5/2010 | Akimoto et al. ................ 257/43 |

FOREIGN PATENT DOCUMENTS

| JP | 2006041429 A | * | 2/2006 |
|---|---|---|---|
| JP | 2008041863 A | * | 2/2008 |

OTHER PUBLICATIONS

Aoyagi et al., "Kyoyudentai to Polymer Kadotai o Mochiita Micro Kasokudo Sensor no Kaihatsu," Nendo The Japan Society for Precision Engineering Shuki Taikai Gakujutsu Koenki Koen Ronbunshu, The Japan Society for Precision Engineering, pp. 955-956 (2006).
Collection of the Lecture Treaties Presented at the Symposium held by Kansai University Org. for Research and Dev't. of Innovative Science and Tech. 8:153-156 (2004).

* cited by examiner

*Primary Examiner* — Andre Allen
(74) *Attorney, Agent, or Firm* — Fish & Richardson P.C.

(57) ABSTRACT

Provided is an acceleration sensor that has high detection sensitivity and that can enhance production efficiency. The acceleration sensor has: a ceramic substrate made of $Al_2O_3$; a ferroelectric layer formed in a predetermined area on the ceramic substrate by screen printing, the ferroelectric layer being made of $BaTiO_3$; a proof mass disposed so as to face the ferroelectric layer, the proof mass being formed at a predetermined distance d from the ferroelectric layer; and a first electrode and a second electrode that are formed on that side of the proof mass which faces the ferroelectric layer, so as to be fixed thereto. The first electrode and the second electrode are each formed in the shape of comb teeth, and comb tooth portions and thereof are arranged in an alternating manner.

13 Claims, 22 Drawing Sheets

FIRST FORMATION PATTERN

FIRST FORMATION PATTERN

SECOND FORMATION PATTERN

SECOND FORMATION PATTERN

THIRD FORMATION PATTERN

THIRD FORMATION PATTERN

ACCELERATION SENSOR AND METHOD OF FABRICATING IT

TECHNICAL FIELD

The present invention relates to an acceleration sensor and a method of fabricating it, and more particularly to a capacitance type acceleration sensor and a method of fabricating it.

BACKGROUND ART

Conventionally, a capacitance type acceleration sensor formed by using a MEMS (Micro Electro Mechanical System) technology is known. Such a capacitance type acceleration sensor in general has a structure in which a proof mass (a weight: a movable portion) that is provided in the sensor and has a predetermined mass is supported by a beam or the like. As a result, when the acceleration sensor undergoes acceleration, the proof mass provided in the sensor is moved by an inertial force. Therefore, by equating the amount of movement with a change in capacitance value, the acceleration is detected.

Incidentally, as the capacitance type acceleration sensor described above, conventionally, an acceleration sensor having comb teeth on the sides of the proof mass is generally known.

FIG. 47 is a plan view showing an example of a conventional acceleration sensor. With reference to FIG. 47, in a conventional acceleration sensor 100, a proof mass 102, beam portions 103, supporting portions 104, fixed electrodes 105, and the like are formed on a silicon substrate 101 by a surface micromachining technique. In addition, the proof mass 102 has comb teeth 102a on the sides thereof. Moreover, the fixed electrodes 105 are each composed of a first fixed electrode 106 and second fixed electrodes 107, and the first fixed electrode 106 is composed of a fixed electrode supporting portion 106a and comb tooth-shaped fixed electrodes 106b formed on the side of the fixed electrode supporting portion 106a, the comb tooth-shaped fixed electrodes 106b being placed alternately with the comb teeth 102a of the proof mass 102. Furthermore, the second fixed electrodes 107 are formed so as to extend parallel to the comb tooth-shaped fixed electrodes 106ba as seen in a plan view. At least part of the second fixed electrode 107 is arranged between the comb tooth 102a of the proof mass 102 and the comb tooth-shaped fixed electrode 106b. Moreover, the proof mass 102 is generally made of polysilicon (a conductor), and is so constructed that the comb teeth 102a of the proof mass 102 function as movable electrodes 102a. As a result, the sides of the comb teeth (movable electrodes) 102a formed in the proof mass 102 and the sides of the fixed electrodes 105 (the comb tooth-shaped fixed electrodes 106b and the second fixed electrodes 107) form capacitors.

In the above-described conventional acceleration sensor 100 shown in FIG. 47, when the sensor undergoes acceleration, an inertial force acts on the proof mass 102, whereby the proof mass 102 moves in a horizontal direction (a direction indicated by arrow X or Y). This causes a change in distance between the sides of the movable electrodes 102a and the fixed electrodes 105 (the comb tooth-shaped fixed electrodes 106b and the second fixed electrodes 107), resulting in a change in capacitance value. By detecting the change in capacitance value, the acceleration the sensor undergoes is detected.

However, in the above-described conventional acceleration sensor 100 shown in FIG. 47, to increase the capacitance of the capacitors formed with the sides of the comb teeth (movable electrodes) 102a of the proof mass 102 and the sides of the fixed electrodes 105 (the comb tooth-shaped fixed electrodes 106b and the second fixed electrodes 107), it is necessary to increase the area of the sides of the comb teeth 102a and the area of the sides of the fixed electrodes 105 (the comb tooth-shaped fixed electrodes 106b and the second fixed electrodes 107). This makes it necessary to increase the thickness of the proof mass 102 and the fixed electrodes 105, resulting in the inconvenience of having to use a DRIE (deep reactive ion etching) process when the comb teeth 102a are formed in the proof mass 102a, or when the fixed electrodes 105 are formed. This undesirably reduces production efficiency.

It is for this reason that a capacitance type acceleration sensor that can prevent a reduction in production efficiency has been conventionally proposed (see, for example, Non-Patent Document 1).

FIG. 48 is a schematic sectional view showing the structure of a conventional acceleration sensor proposed in Non-Patent Document 1 described above. With reference to FIG. 48, in a conventional acceleration sensor 200 proposed in Non-Patent Document 1 described above, two electrodes (a first electrode 202 and a second electrode 203) are disposed on the upper surface of a silicon substrate 201 so as to be adjacent to each other. Here, in the acceleration sensor 200 proposed in Non-Patent Document 1 described above, as a result of a voltage being applied between electrodes, a fringe field 204 (an electric field generated beside a space between the electrodes) is generated between the first electrode 202 and the second electrode 203. In addition, above the first electrode 202 and the second electrode 203, a proof mass 205 made of parylene (relative permittivity: 3.15) is supported by beam portions 206 so as to be located in the fringe field 204. Incidentally, the proof mass 205 is so structured as to be movable in a vertical direction (a direction indicated by arrow Z) with respect to the upper surface of the silicon substrate 201.

In the conventional acceleration sensor 200 structured as described above, when the proof mass 205 moves in a direction indicated by arrow Z as a result of the sensor undergoing acceleration, the proportion of the volume of the proof mass 205 (dielectric) in the fringe field 204 changes, causing a change in capacitance value. Therefore, by detecting the change in capacitance value, the acceleration the sensor undergoes is detected.

Moreover, in the above-described acceleration sensor 200 proposed in Non-Patent Document 1, unlike the above-described acceleration sensor 100 having the comb teeth 102a as shown in FIG. 47, there is no need for a DRIE process in the fabrication process. This helps prevent a reduction in production efficiency.

Non-Patent Document 1: the Collection of the Lecture Treatises Presented at the Symposium held by Kansai University Organization for Research and Development of Innovative Science and Technology, Vol. 8th, Pages 153-156 (2004. 01. 10)

DISCLOSURE OF THE INVENTION

Problems to be Solved by the Invention

However, the above-described conventional acceleration sensor 200 proposed in Non-Patent Document 1 has a drawback in that, since the proof mass 205 serving as a dielectric is made of parylene, the relative permittivity of the dielectric is relatively small. This undesirably makes it difficult to improve the sensitivity with which acceleration is detected.

In view of the conventionally experienced problems described above, it is an object of the present invention to provide an acceleration sensor that has high detection sensitivity and that can enhance production efficiency, and a method of fabricating it.

Means for Solving the Problem

To achieve the above object, according to a first aspect of the invention, an acceleration sensor is provided with: a ceramic substrate; a dielectric layer formed in a predetermined area on the ceramic substrate by screen printing, the dielectric layer being made of a metal oxide; a movable portion disposed so as to face the dielectric layer, the movable portion being formed at a predetermined distance from the dielectric layer; and a first electrode and a second electrode that are formed on that side of the movable portion which faces the dielectric layer.

In the acceleration sensor according to the first aspect, as described above, by forming the first electrode and the second electrode on that side of the movable portion which faces the dielectric layer, it is possible to generate a fringe field between the first electrode and the second electrode. In addition, by forming the dielectric layer made of a metal oxide in a predetermined area on the ceramic substrate, in a case where a metal oxide having a relative permittivity of 1000 or more, for example, is used as a metal oxide forming the dielectric layer, it is possible to make the relative permittivity of the dielectric layer satisfactorily large as compared with parylene (relative permittivity: 3.15). This makes it possible to detect a change in capacitance value caused by a change in the proportion of the volume of the dielectric layer in the fringe field with high accuracy, and thereby makes it possible to detect the acceleration the sensor undergoes with high sensitivity.

Moreover, in the first aspect, by forming the dielectric layer in a predetermined area on the ceramic substrate by using screen printing, it is possible to easily form the dielectric layer in a predetermined area on the ceramic substrate. This makes it possible to enhance production efficiency as compared with when, for example, a plate-like dielectric layer is attached on the ceramic substrate. In the structure described above, as compared with when the dielectric layer is formed by using sputtering, a sol-gel process, or the like, it is possible to increase the thickness of the dielectric layer. This helps prevent the possibility that it becomes difficult to detect a change in capacitance value with high accuracy due to a small thickness of the dielectric layer. As a result, it is possible to improve the sensitivity with which acceleration is detected while enhancing production efficiency. In addition, by using a ceramic substrate as a substrate, it is possible to provide higher electrical insulation and higher mechanical strength than when a silicon substrate or the like is used as a substrate. This makes it possible to improve detection sensitivity while enhancing production efficiency, and also increase reliability.

According to a second aspect of the invention, an acceleration sensor is provided with: a ceramic substrate; a dielectric layer formed in a predetermined area on the ceramic substrate by screen printing, the dielectric layer being made of a metal oxide; a movable portion disposed so as to face the dielectric layer, the movable portion being formed at a predetermined distance from the dielectric layer; and a first electrode and a second electrode that are formed on that side of the movable portion which faces the dielectric layer. Here, a metal layer is formed in a predetermined area on an upper surface of the dielectric layer.

In the acceleration sensor according to the second aspect, as described above, by forming the first electrode and the second electrode on that side of the movable portion which faces the dielectric layer, it is possible to generate a fringe field between the first electrode and the second electrode. In addition, by forming a metal layer in a predetermined area on the upper surface of the dielectric layer, even when the movable portion moves in a predetermined direction parallel to the principal surface (upper surface) of the ceramic substrate, it is possible to change the appearance of the lines of electric force of the fringe field. That is, while the lines of electric force of the fringe field generated between the first electrode and the second electrode can pass through the dielectric layer, they cannot pass through the metal layer, and therefore, by forming the metal layer in a predetermined area on the upper surface of the dielectric layer, it is possible to cause the appearance of the lines of electric force of the fringe field to change as the movable portion to which the first electrode and the second electrode are fixed moves in a predetermined direction parallel to the principal surface (upper surface) of the ceramic substrate (the dielectric layer). As a result, the capacitance value changes with changes in the appearance of the lines of electric force, making it possible to detect acceleration in a predetermined direction parallel to the principal surface (upper surface) of the ceramic substrate (the dielectric layer) by detecting the change in capacitance value, and detect the acceleration the sensor undergoes with high sensitivity.

In addition, in the second aspect, by forming the dielectric layer in a predetermined area on the ceramic substrate by using screen printing, it is possible to easily form the dielectric layer in a predetermined area on the ceramic substrate. This makes it possible to enhance production efficiency as compared with when, for example, a plate-like dielectric layer is attached to a predetermined area on the ceramic substrate. Incidentally, in the acceleration sensor structured as described above, fabrication is possible without using a DRIE process. In addition, by using a ceramic substrate as a substrate, it is possible to provide higher electrical insulation and higher mechanical strength than when a silicon substrate or the like is used as a substrate. This helps improve detection sensitivity when acceleration in a predetermined direction parallel to the principal surface (upper surface) of the ceramic substrate (the dielectric layer) is detected, and increase the reliability of the acceleration sensor.

In the acceleration sensor according to the second aspect, preferably, the metal layer is formed so as not to protrude from the upper surface of the dielectric layer. With this structure, even when the metal layer is formed on the upper surface of the dielectric layer, it is possible to carry on the subsequent fabrication process by the same process as in the case where no metal layer is formed. This helps prevent the possibility that the subsequent fabrication process becomes complicated due to the metal layer protruding from the upper surface of the dielectric layer. This makes it possible to easily enhance production efficiency. Moreover, with this structure, it is possible to prevent the engagement between the metal layer and the movable portion (the first electrode, the second electrode) as the movable portion moves in a predetermined direction parallel to the principal surface (upper surface) of the ceramic substrate (the dielectric layer). This helps prevent the possibility that the engagement between the metal layer and the movable portion (the first electrode, the second electrode) interferes with the movement of the movable portion in a predetermined direction parallel to the principal surface (upper surface) of the ceramic substrate (the dielectric layer). As a result, it is possible to easily detect acceleration in a predetermined direction parallel to the principal surface (upper surface) of the ceramic substrate (the dielectric layer).

In the acceleration sensor according to the second aspect, preferably, a beam portion supporting the movable portion is further provided, and the beam portion is longer in a thickness direction than in a width direction. With this structure, it is possible to prevent the movable portion from moving in a vertical direction with respect to the principal surface (upper surface) of the ceramic substrate (the dielectric layer), making it possible to prevent an acceleration component in a vertical direction with respect to the principal surface (upper surface) of the ceramic substrate (the dielectric layer) from being contained in the detected acceleration. This makes it possible to easily detect acceleration in a predetermined direction parallel to the principal surface (upper surface) of the ceramic substrate (the dielectric layer), and to easily improve the accuracy of detection.

In the acceleration sensor according to the first and second aspects, preferably, the dielectric layer is made of $BaTiO_3$. With this structure, since $BaTiO_3$ is a metal oxide (ferroelectric material) having a relative permittivity of 1000 or more, it is possible to make the relative permittivity of the dielectric layer satisfactorily large as compared with parylene (relative permittivity: 3.15). This makes it possible to easily detect a change in capacitance value with high accuracy. In addition, even if the distance between the dielectric layer and the movable portion is increased, it is possible to prevent a reduction in the sensitivity with which a capacitance value is detected. As a result, it is possible to prevent the occurrence of stiction (sticking between the dielectric layer and the movable portion) by increasing the distance between the dielectric layer and the movable portion. This makes it possible to easily improve sensitivity with which acceleration is detected while enhancing production efficiency, and also prevent a decrease in reliability due to the occurrence of stiction. Incidentally, since $BaTiO_3$ is a ferroelectric material containing no Pb (lead), by making the dielectric layer out of $BaTiO_3$, it is possible to reduce the environmental burden of waste products and their adverse effects on humans.

In the acceleration sensor according to the first and second aspects, preferably, the ceramic substrate is made of $Al_2O_3$. With this structure, it is possible to easily provide higher electrical insulation and higher mechanical strength. This makes it possible to improve the sensitivity with which acceleration is detected while enhancing production efficiency, and also increase reliability.

In the acceleration sensor according to the first and second aspects, preferably, the first electrode and the second electrode are each formed in the shape of comb teeth having a plurality of comb tooth portions, and, as seen in a plan view, the comb tooth portions thereof are arranged at predetermined intervals in an alternating manner. With this structure, it is possible to generate a fringe field uniformly on the reverse side (lower surface) of the movable portion. This makes it possible to detect a change in capacitance value caused by a change in the proportion of the volume of the dielectric layer in the fringe field. This makes it possible to improve detection sensitivity more easily while enhancing production efficiency.

In the acceleration sensor according to the first and second aspects, preferably, the dielectric layer has a thickness of 5 μm or more. With this structure, it is possible to prevent the possibility that it becomes difficult to detect a change in capacitance value with high accuracy due to the dielectric layer having a thickness of less than 5 μm. As a result, it is possible to more easily improve the sensitivity with which acceleration is detected while enhancing production efficiency.

In the acceleration sensor according to the first and second aspects, between the ceramic substrate and the dielectric layer, a glaze layer may be further formed. Incidentally, the glaze layer of the present invention is a layer for obtaining a smooth surface suitable for formation of the dielectric layer or the like.

According to a third aspect of the present invention, a method of fabricating an acceleration sensor is provided with: a step of forming a dielectric layer made of a metal oxide in a predetermined area on a ceramic substrate by using screen printing; a step of forming a first electrode and a second electrode so as to be located above the dielectric layer; and a step of forming a movable portion above the dielectric layer so as to face the dielectric layer, the movable portion to which the first electrode and the second electrode are fixed.

In the method of fabricating an acceleration sensor according to the third aspect, as described above, by forming the dielectric layer made of a metal oxide in a predetermined area on the ceramic substrate, in a case where a metal oxide having a relative permittivity of 1000 or more, for example, is used as a metal oxide forming the dielectric layer, it is possible to make the relative permittivity of the dielectric layer satisfactorily large as compared with parylene (relative permittivity: 3.15). This makes it possible to detect a change in capacitance with high accuracy, and thereby makes it possible to detect the acceleration the sensor undergoes with high sensitivity. In addition, by forming the dielectric layer in a predetermined area on the ceramic substrate by using screen printing, it is possible to easily form the dielectric layer in a predetermined area on the ceramic substrate. This makes it possible to enhance production efficiency as compared with when, for example, a plate-like dielectric layer is attached on the ceramic substrate.

In addition, in the third aspect, by forming the dielectric layer by using screen printing, as compared with when the dielectric layer is formed by using sputtering, a sol-gel process, or the like, it is possible to increase the thickness of the dielectric layer with ease. This helps prevent the possibility that it becomes difficult to detect a change in capacitance value with high accuracy due to a small thickness of the dielectric layer. As a result, it is possible to fabricate an acceleration sensor having high sensitivity while enhancing production efficiency. In addition, by using a ceramic substrate as a substrate, it is possible to provide higher electrical insulation and higher mechanical strength than when a silicon substrate or the like is used as a substrate. This makes it possible to improve detection sensitivity while enhancing production efficiency, and also increase reliability. Incidentally, the above-described structure eliminates the need for a DRIE process in the fabrication process of the acceleration sensor.

In the method of fabricating an acceleration sensor according to the third aspect, preferably, the step of forming the dielectric layer includes a step of making the dielectric layer out of $BaTiO_3$. With this structure, since $BaTiO_3$ is a metal oxide (ferroelectric material) having a relative permittivity of 1000 or more, it is possible to make the relative permittivity of the dielectric layer satisfactorily large as compared with parylene (relative permittivity: 3.15). This makes it possible to easily detect a change in capacitance value with high accuracy. In addition, even if the distance between the dielectric layer and the movable portion is increased, it is possible to prevent a reduction in the sensitivity with which a capacitance value is detected. As a result, it is possible to prevent the occurrence of stiction by increasing the distance between the dielectric layer and the movable portion. This makes it possible to easily improve sensitivity with which acceleration is detected while enhancing production efficiency, and also prevent a decrease in reliability due to the occurrence of stiction. Incidentally, since $BaTiO_3$ is a ferroelectric material containing no Pb (lead), by making the dielectric layer out of $BaTiO_3$, it is possible to reduce the environmental burden of waste products and their adverse effects on humans.

In the method of fabricating an acceleration sensor according to the third aspect, preferably, the step of forming the first electrode and the second electrode includes a step of forming each of the first electrode and the second electrode in the shape of comb teeth having a plurality of comb tooth portions, and arranging, as seen in a plan view, the comb tooth portions thereof at predetermined intervals in an alternating manner. With this structure, it is possible to generate a fringe field uniformly on the reverse side (lower surface) of the movable portion. This makes it possible to detect a change in capacitance value caused by a change in the proportion of the volume of the dielectric layer in the fringe field. This makes it possible to improve detection sensitivity more easily while enhancing production efficiency.

In the method of fabricating an acceleration sensor according to the third aspect, preferably, a step of forming a wiring layer on the surface of the ceramic substrate by screen printing is further provided. With this structure, it is possible to form the wiring layer with ease. This also contributes to enhancement of production efficiency.

Advantages of the Invention

As described above, according to the present invention, it is possible to easily achieve an acceleration sensor that has high detection sensitivity and that can enhance production efficiency, and a method of fabricating it.

LIST OF REFERENCE SYMBOLS

Figure 1:
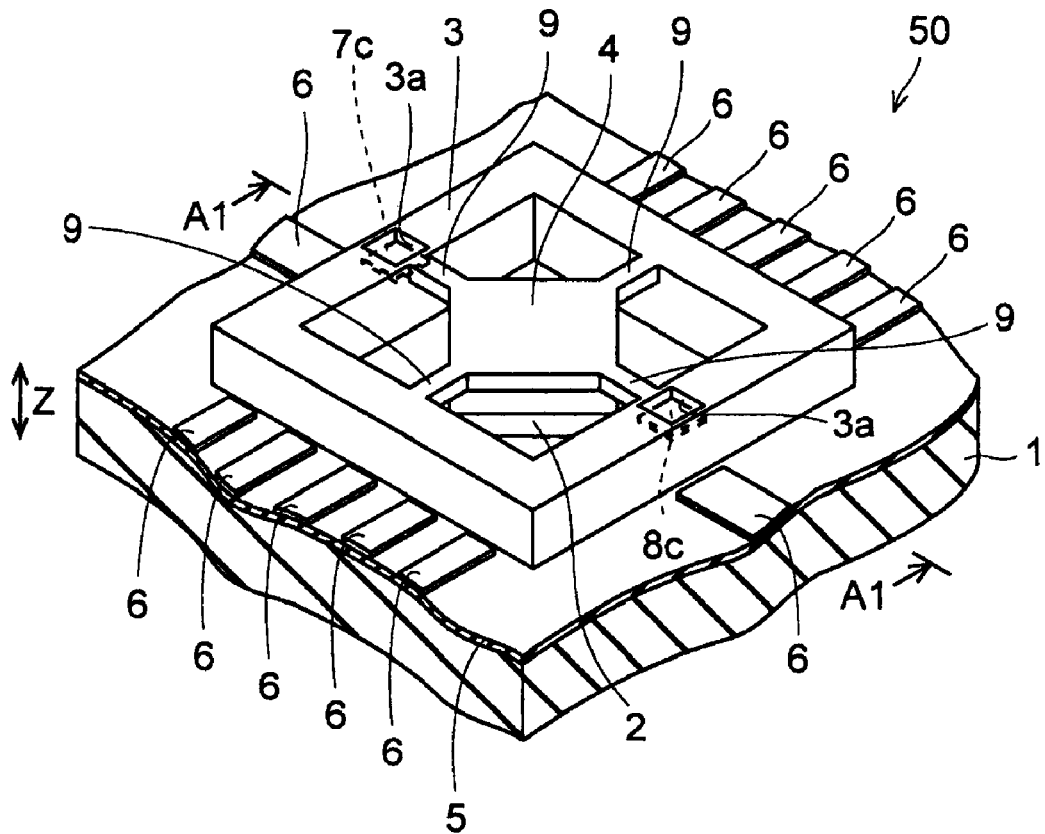
FIG. 1 A perspective view showing the structure of an acceleration sensor according to a first embodiment of the invention.

1 Ceramic substrate
2, 22 Ferroelectric layer (dielectric layer)
3, 23 Frame portion
3a, 2 Opening
4, 24 Proof mass (movable portion)
5 Glaze layer
6 Wiring layer
7, 27 First electrode
7a, 8a, 27a, 28a Comb tooth portion
7b, 8b, 27b, 28b Connection portion
7c, 8c, 27c, 28c Pad electrode
8, 28 Second electrode
9, 29 Beam portion
10 Fringe field
11, 31 Sacrifice layer

BEST MODE FOR CARRYING OUT THE INVENTION

Hereinafter, with reference to the drawings, embodiments of the present invention will be described.

First Embodiment

Figure 2:
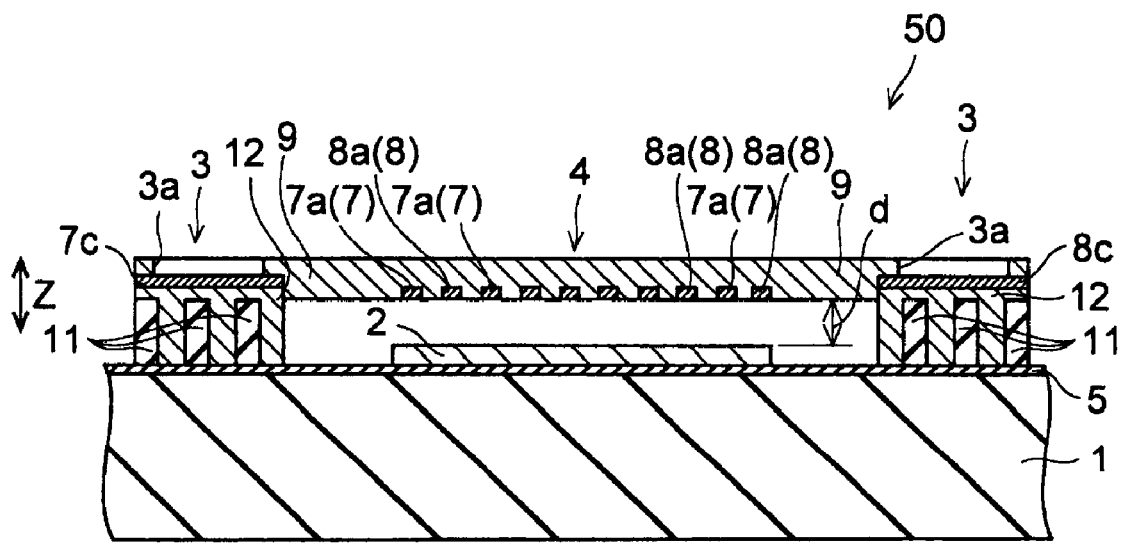
FIG. 2 A sectional view taken on the line A1-A1 of FIG. 1.
Figure 3:
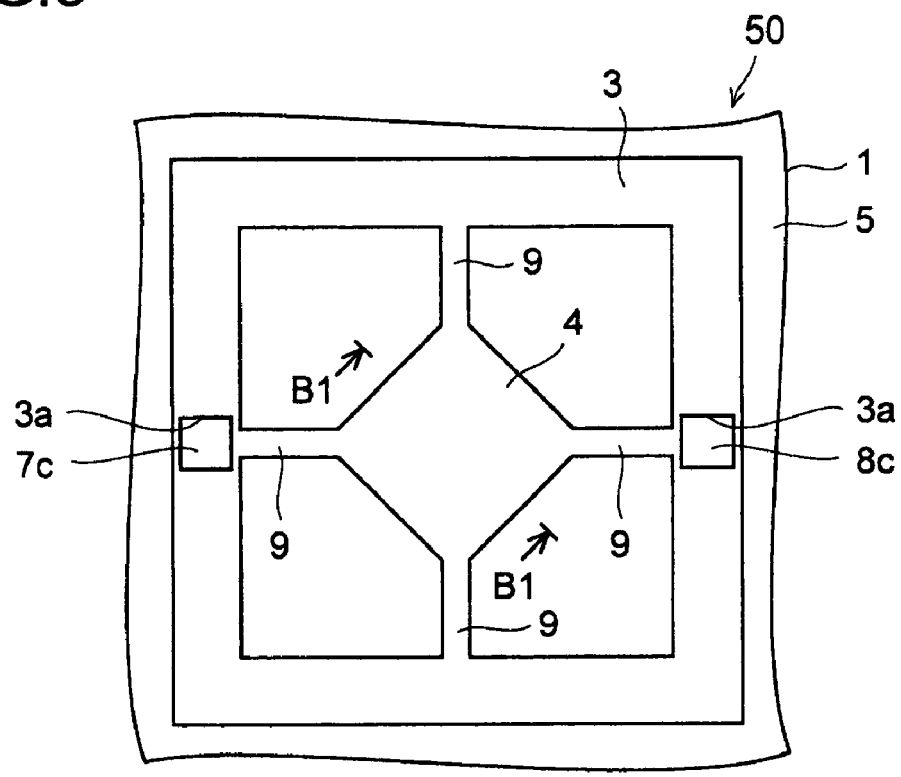
FIG. 3 A plan view of the acceleration sensor according to the first embodiment of the invention.

FIG. 1 is a perspective view showing the structure of an acceleration sensor according to a first embodiment of the invention. FIG. 2 is a sectional view taken on the line A1-A1 of FIG. 1. FIG. 3 is a plan view of the acceleration sensor according to the first embodiment of the invention shown in FIG. 1. FIGS. 4 to 7 are illustrations for explaining the structure of the acceleration sensor according to the first embodiment of the invention. First, with reference to FIGS. 1 to 7, the structure of an acceleration sensor 50 according to the first embodiment of the invention will be described.

The acceleration sensor 50 according to the first embodiment includes, as shown in FIG. 1, a ceramic substrate 1, a ferroelectric layer 2 formed on the ceramic substrate 1, a frame portion 3 formed on the ceramic substrate 1 so as to surround the ferroelectric layer 2, and a proof mass 4 placed within the frame portion 3. The ferroelectric layer 2 is an example of a "dielectric layer" of the invention, and the proof mass 4 is an example of a "movable portion" of the invention.

The ceramic substrate 1 is made of $Al_2O_3$, and has a thickness of approximately 1 mm. On the upper surface of the ceramic substrate 1, a glaze layer 5 is formed. The glaze layer 5 is formed for obtaining a smooth surface suitable for formation of the ferroelectric layer 2 or the like. Moreover, in a predetermined area on the upper surface of the ceramic substrate 1 (glaze layer 5), the predetermined area located outside the frame portion 3, a wiring layer 6 formed by screen printing is provided. The wiring layer 6 is made of, for example, Au (gold) or the like.

Figure 4:
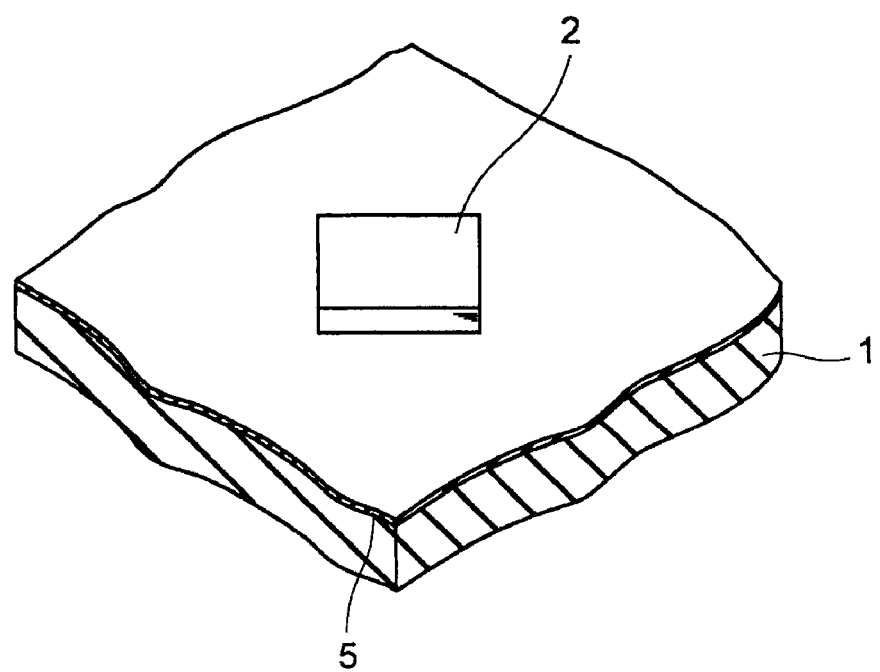
FIG. 4 A perspective view showing the structure of the ferroelectric layer of the acceleration sensor according to the first embodiment of the invention.

Here, in the first embodiment, the ferroelectric layer 2 is made of $BaTiO_3$ (relative permittivity: 1000 or more). In addition, as shown in FIGS. 2 and 4, the ferroelectric layer 2 is formed in a predetermined area on the ceramic substrate 1 (glaze layer 5) by screen printing. The ferroelectric layer 2 has a substantially quadrangular shape, as seen in a plan view.

Moreover, in the first embodiment, the ferroelectric layer 2 is formed so as to have a thickness of 5 μm or more. Specifically, the ferroelectric layer 2 is formed so as to have a thickness t1 (see FIG. 6) of 5 to 20 pin.

Furthermore, in the first embodiment, the upper surface of the ferroelectric layer 2 has a surface roughness (not shown) of the order of 0.1 to 0.2 μm, which is formed by controlling the particle size of $BaTiO_3$. This makes it possible to reduce area of contact between the proof mass 4 and the ferroelectric layer 2, even if the proof mass 4 makes contact with the upper surface of the ferroelectric layer 2. As a result, it is possible to prevent stiction (sticking between the ferroelectric layer 2 and the proof mass 4) effectively.

Figure 6:
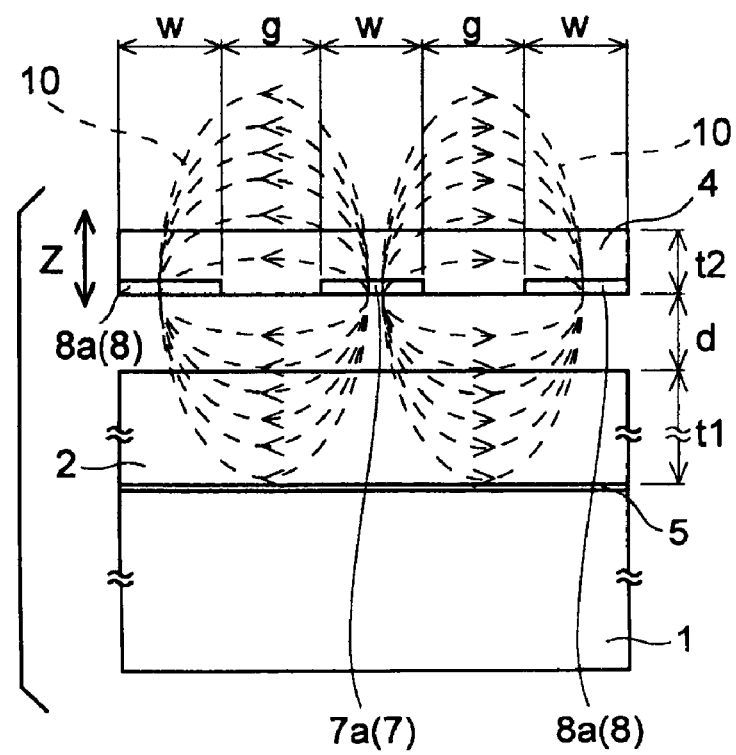
FIG. 6 A sectional view taken on the line B1-B1 of FIG. 3.

In addition, the proof mass 4 is made of parylene (paraxylylene base resin: Parylen), and is formed so as to have a thickness t2 (see FIG. 6) of approximately 5 nm, as shown in FIGS. 2 and 6. Moreover, as shown in FIG. 3, the proof mass 4 is formed in a substantially quadrangular shape (approximately 1000 μm per side), as seen in a plan view.

Figure 5:
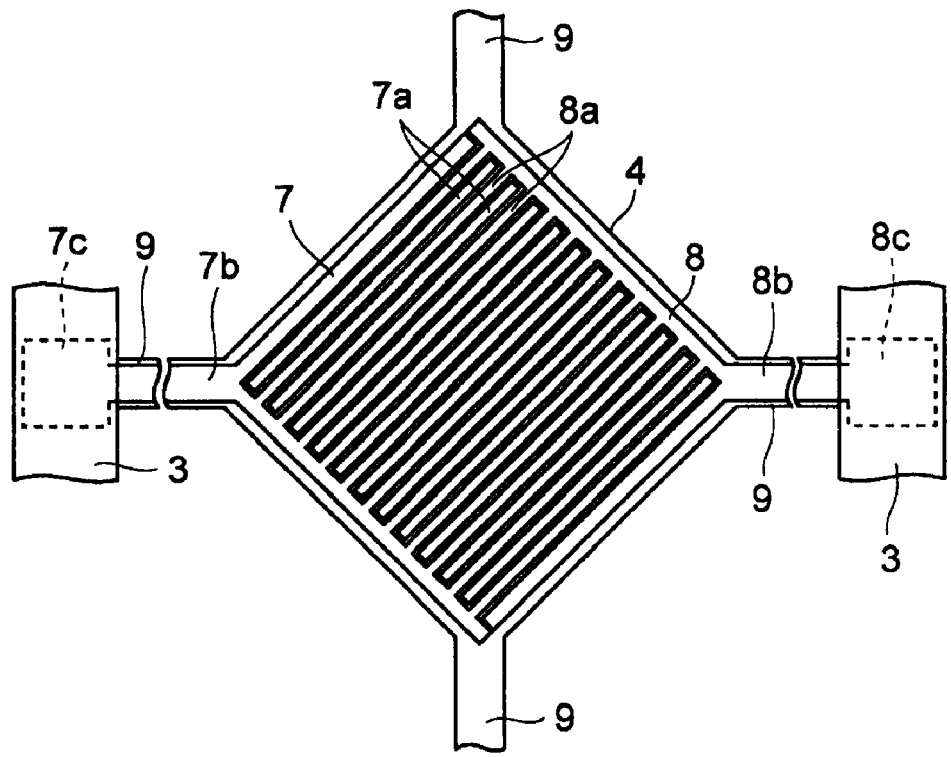
FIG. 5 A plan view of the proof mass, as seen from the reverse side thereof, of the acceleration sensor according to the first embodiment of the invention.
Figure 7:
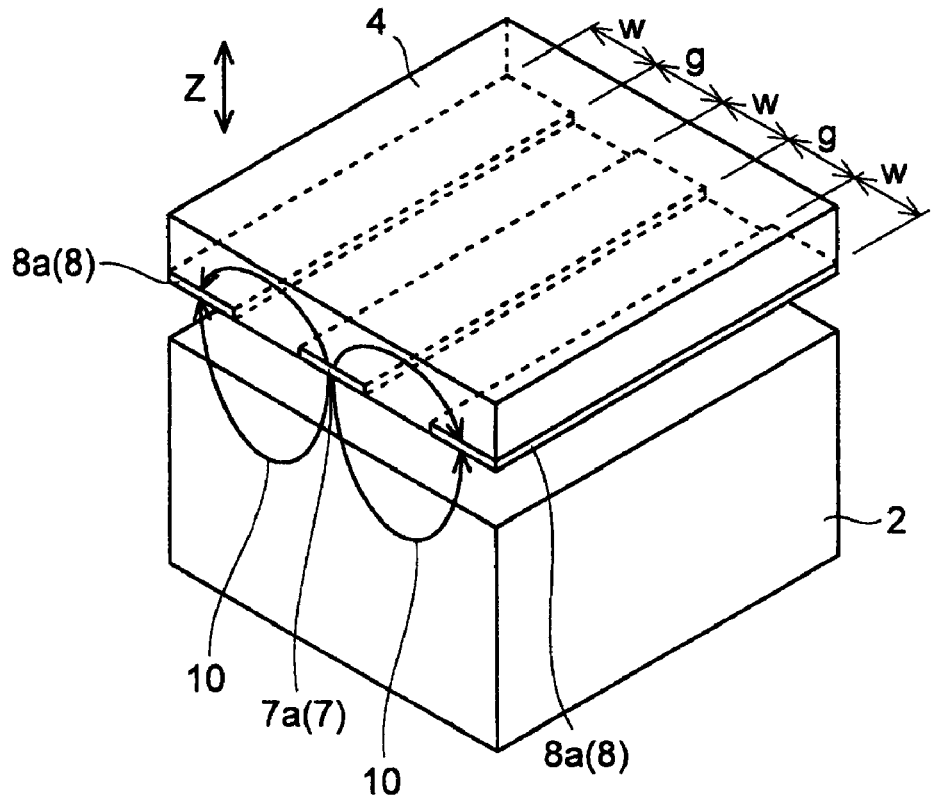
FIG. 7 A perspective view showing part of the acceleration sensor according to the first embodiment of the invention.

Here, in the first embodiment, as shown in FIG. 5, on the reverse side (lower surface) of the proof mass 4, two electrodes (a first electrode 7 and a second electrode 8) made of aluminum are formed in the same plane so as to lie next to each other. Specifically, the first electrode 7 and the second electrode 8 are formed in the shape of comb teeth, as seen in a plan view, such that comb tooth portions 7a of the first electrode 7 and comb tooth portions 8a of the second electrode 8 are arranged in an alternating manner. In addition, as shown in FIGS. 6 and 7, a width w of each comb tooth portion 7a of the first electrode 7 and a width w of each comb tooth portion 8a of the second electrode 8 are approximately 5 μm, and a length g from each comb tooth portion 7a of the first electrode 7 to an adjacent comb tooth portion 8a of the second electrode 8 is also approximately 5 μm. It is to be noted that, in the acceleration sensor 50 according to the first embodiment, as shown in FIG. 5, the first electrode 7 and the second electrode 8 are formed almost all over the reverses side (lower surface) of the proof mass 4.

In addition, the proof mass 4 includes, as shown in FIGS. 1 and 3, four beam portions 9 that are integrally connected thereto. These four beam portions 9 are provided one for each of four corners of the proof mass 4, and are formed so as to spread radially, as seen in a plan view. Moreover, the four beam portions 9 are integrally connected, at the ends thereof, to the frame portion 3. This allows the proof mass 4 to be supported above the ferroelectric layer 2 while facing the ferroelectric layer 2, as shown in FIGS. 1 and 2. Incidentally, a distance d (see FIGS. 2 and 6) from the upper surface of the ferroelectic layer 2 to the proof mass 4 (the first electrode 7 and the second electrode 8) is approximately 1 µm.

Furthermore, the four beam portions 9 each have a thickness of approximately 5 µm and a width of approximately 50 µm. That is, the four beam portions 9 are made longer in the width direction than in the thickness direction, so as to make it easier for them to elastically deform in a vertical direction (a direction indicated by arrow Z) with respect to the upper surface of the ceramic substrate 1. As a result, when the proof mass 4 supported by the four beam portions 9 undergoes acceleration, an inertial force allows the proof mass 4 to move in a vertical direction (a direction indicated by arrow Z) with respect to the upper surface of the ceramic substrate 1.

In addition, as shown in FIG. 5, the first electrode 7 described above is electrically connected to a pad electrode 7c via a connection portion 7b, and the second electrode 8 described above is electrically connected to a pad electrode 8c via a connection portion 8b.

Furthermore, as shown in FIG. 2, the frame portion 3 has a thickness greater than that of the proof mass 4, and, as shown in FIGS. 1 to 3, has a function of holding the proof mass 4 via the beam portions 9. Incidentally, the frame portion 3 is made primarily of parylene. In addition, in a predetermined area of the frame portion 3, openings 3a for exposing the surfaces of the pad electrodes 7c and 8c are formed.

Figure 8:
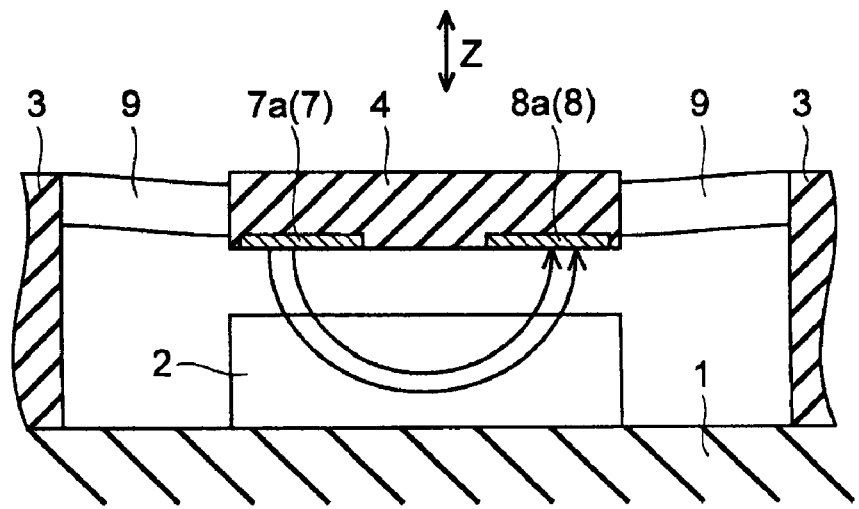
FIG. 8 A schematic sectional view illustrating the operation of the acceleration sensor according to the first embodiment of the invention.

FIG. 8 is a schematic sectional view illustrating the operation of the acceleration sensor according to the first embodiment of the invention. Next, with reference to FIGS. 5 to 8, the operation of the acceleration sensor 50 according to the first embodiment of the invention will be described.

In the acceleration sensor 50 according to the first embodiment, by applying a voltage between the pad electrode 7c (see FIG. 5) and the pad electrode 8c (see FIG. 5), as shown in FIGS. 6 and 7, a fringe field (an electric field generated beside a space between the electrodes) 10 is generated between the comb tooth portions 7a of the first electrode 7 and the comb tooth portions 8a of the second electrode 8. Here, as shown in FIG. 5, since the first electrode 7 and the second electrode 8 generating the fringe field 10 are each formed in the shape of comb teeth, and the comb tooth portions 7a of the first electrode 7 and the comb tooth portions 8a of the second electrode 8 are arranged in an alternating manner, the fringe field 10 is uniformly generated almost all over the reverse side (lower surface) of the proof mass 4. On the other hand, as shown in FIGS. 6 to 8, the ferroelectric layer 2 facing the proof mass 4 is located in the fringe field 10 thus generated.

If the acceleration sensor 50 undergoes acceleration in this state, an inertial force acts on the proof mass 4. As a result, as shown in FIG. 8, the proof mass 4 moves in a direction indicated by arrow Z. This causes a change in the proportion of the volume of the ferroelectric layer 2 in the fringe field 10, leading to a change in capacitance value. Therefore, by detecting the change in capacitance value, the acceleration the acceleration sensor 50 has undergone is detected.

Next, the result of a computer simulation performed for evaluating the effectiveness of the acceleration sensor 50 according to the first embodiment will be described. In this computer simulation, cover ratios are obtained by varying the thickness t1 of the ferroelectric layer 2.

Figure 9:
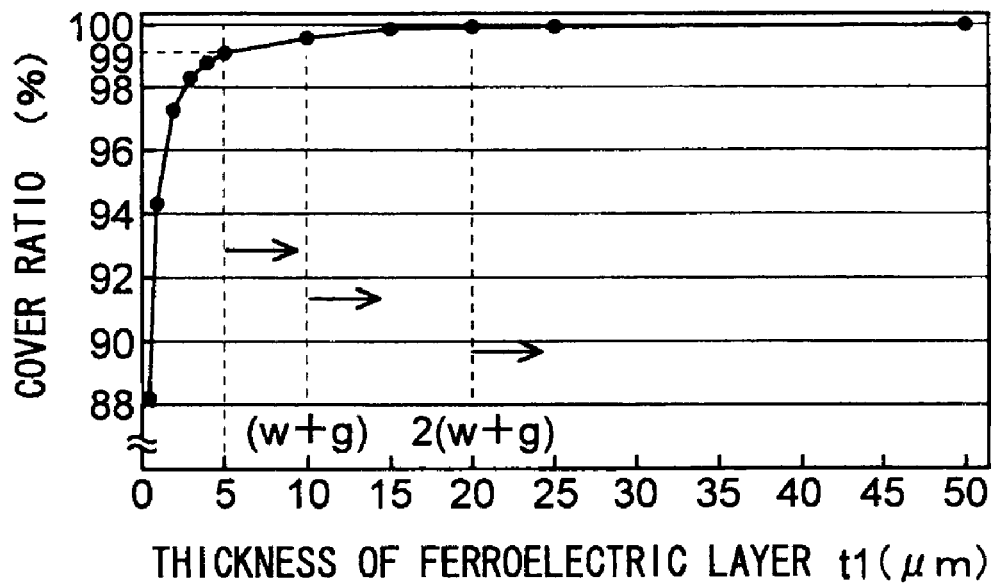
FIG. 9 A graph showing the relationship between the thickness of the ferroelectric layer and the cover ratio.

FIG. 9 is a graph showing the relationship between the thickness of the ferroelectric layer and the cover ratio. The vertical axis of FIG. 9 represents the cover ratio (%), and the horizontal axis of FIG. 9 represents the thickness t1 (µm) of the ferroelectric layer 2. That is, FIG. 9 shows a change in the cover ratio observed when the thickness t1 of the ferroelectric layer 2 is varied in the structure of the above-described acceleration sensor 50 according to the first embodiment. Here, the cover ratio is given by formula (1) below.

$$\text{Cover ratio (\%)}=(X1-X2)/X1\times100 \qquad (1)$$

wherein

X1 is the number of lines of electric force of the fringe field 10, the lines of electric force that entered the region of the ferroelectric layer 2, and X2 is the number of lines of electric force that were unable to turn around in the region of the ferroelectric layer 2 and exited from the bottom of the region of the ferroelectric layer 2.

That is, the cover ratio is a numerical value indicating the proportion of lines of electric force that turned around in the region of the ferroelectric layer 2 to lines of electric force that entered the ferroelectric layer 2. The higher the value is, the higher the sensitivity with which a change in capacitance value is detected. Incidentally, a voltage of 0 V was applied to one (the first electrode 7 or the second electrode 8) of the electrodes, and a voltage of 5 V was applied to the other (the second electrode 8 or the first electrode 7).

As shown in FIG. 9, it was found out that a cover ratio of 99% or more can be obtained by making the ferroelectric layer 2 have a thickness t1 of 5 µm or more. It was also found out that a cover ratio of almost 100% (99.8% or more) can be obtained by making the ferroelectric layer 2 have a thickness t1 of 10 µm or more, and a cover ratio of 100% can be obtained by making the ferroelectric layer 2 have a thickness t1 of 20 µm or more. Incidentally, in a case where the thickness t1 of the ferroelectric layer 2 is 10 µm, the thickness t1 of the ferroelectric layer 2 is equal to the total length (w+g: approximately 10 µm) of the width w (approximately 5 µm) of the comb tooth portion 7a (or 8a) of one of the first electrode 7 and the second electrode 8 and the length g (approximately 5 µm) from each comb tooth portion 7a of the first electrode 7 to an adjacent comb tooth portion 8a of the second electrode 8. In a case where the thickness t1 of the ferroelectric layer 2 is 20 µm, the thickness t1 of the ferroelectric layer 2 is equal to twice (2(w+g)) the above-described total length (w+g: approximately 10 µm).

As described above, it has been confirmed that, by making the ferroelectric layer 2 have a thickness t1 of 5 µm or more, a sufficient cover ratio can be obtained, and therefore it is possible to detect a change in capacitance value with high accuracy. As a result, it has been confirmed that it is possible to improve the sensitivity with which acceleration is detected.

In the first embodiment, as described above, by forming the first electrode 7 and the second electrode 8 on that side of the proof mass 4 which faces the ferroelectric layer 2, it is possible to generate the fringe field 10 between the first electrode 7 and the second electrode 8. In addition, by forming the ferroelectric layer 2 made of $BaTiO_3$ in a predetermined area on the ceramic substrate 1, it is possible to make the relative permittivity of the ferroelectric layer 2 satisfactorily large because $BaTiO_3$ is a metal oxide (ferroelectric material) having a relative permittivity of 1000 or more. This makes it possible to detect a change in capacitance value caused by a change in the proportion of the volume of the ferroelectric layer 2 in the fringe field 10 with high accuracy, and thereby makes it possible to detect the acceleration the sensor undergoes with high sensitivity.

In addition, in the first embodiment, by making the ferroelectric layer 2 out of $BaTiO_3$, even if the distance d between the ferroelectric layer 2 and the proof mass 4 is increased, it is possible to prevent a reduction in the sensitivity with which a capacitance value is detected. As a result, it is possible to prevent the occurrence of stiction by increasing the distance d between the ferroelectric layer 2 and the proof mass 4. This helps prevent a decrease in reliability due to the occurrence of stiction. Incidentally, since $BaTiO_3$ is a ferroelectric material containing no Pb (lead), by making the ferroelectric layer 2 out of $BaTiO_3$, it is possible to reduce the environmental burden of waste products and their adverse effects on humans.

Moreover, in the first embodiment, by using the ceramic substrate 1 made of $Al_2O_3$ as a substrate, it is possible to provide higher electrical insulation and higher mechanical strength than when a silicon substrate or the like is used as a substrate. This makes it possible to improve detection sensitivity while enhancing production efficiency, and also increase reliability. In addition, by using the ceramic substrate 1 as a substrate, it is possible to achieve lower production cost than when a silicon substrate is used.

Furthermore, in the first embodiment, by making the ferroelectric layer 2 have a thickness t1 of 5 μm or more, it is possible to obtain a cover ratio of 99% or more. As a result, it is possible to detect a change in capacitance value with high accuracy. This makes it possible to more easily improve the sensitivity with which acceleration is detected while enhancing production efficiency. Preferably, the thickness t1 of the ferroelectric layer 2 is 10 μm or more; more preferably, 20 μm or more.

In addition, in the first embodiment, by forming the glaze layer 5 between the ceramic substrate 1 and the ferroelectric layer 2, it is possible to improve the smoothness of the upper surface of the ferroelectric layer 2. As a result, by controlling the particle size of $BaTiO_3$, it is possible to form a surface roughness of the order of 0.1 to 0.2 μm on the upper surface of the ferroelectric layer 2.

FIGS. 10 to 18 are illustrations for explaining a method of fabricating the acceleration sensor according to the first embodiment of the invention. Hereinafter, with reference to FIGS. 1, 5, 6, and 10 to 18, a method of fabricating the acceleration sensor 50 according to the first embodiment of the invention will be described. Incidentally, the acceleration sensor 50 according to the first embodiment is fabricated by primarily using the surface micromachining technique.

Figure 10:
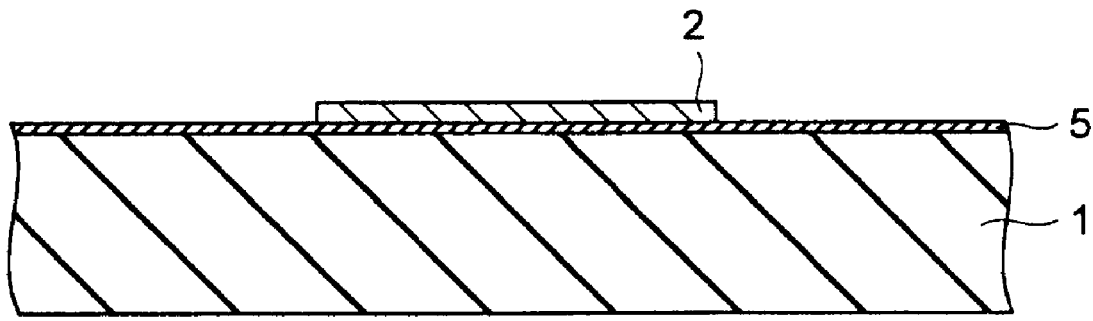
FIG. 10 A sectional view illustrating a method of fabricating the acceleration sensor according to the first embodiment of the invention.

First, as shown in FIG. 10, on the upper surface of the ceramic substrate 1 that has a thickness of approximately 1 mm and is made of $Al_2O_3$, the glaze layer 5 is formed. The glaze layer 5 is formed by, for example, printing a liquid containing glass components on the ceramic substrate 1, and then firing it at a predetermined temperature.

Next, by using screen printing, on the glaze layer 5, the wiring layer 6 shown in FIG. 1 is formed. Then, as shown in FIG. 10, the ferroelectric layer 2 is formed in a predetermined area on the ceramic substrate 1 (the glaze layer 5).

Here, in the first embodiment, the ferroelectric layer 2 is formed by using screen printing. Specifically, after a paste containing $BaTiO_3$ is printed in a predetermined area on the glaze layer 5, the product thus obtained is fired at a firing temperature of the order of 800 to 1200° C. In this way, the ferroelectric layer 2 made of $BaTiO_3$ is formed.

In addition, in the first embodiment, the ferroelectric layer 2 is formed so as to have a thickness t1 (see FIG. 6) of 5 to 20 μm, and is so formed that the upper surface thereof has a surface roughness (not shown) of the order of 0.1 to 0.2 μm by controlling the particle size of $BaTiO_3$.

Figure 11:
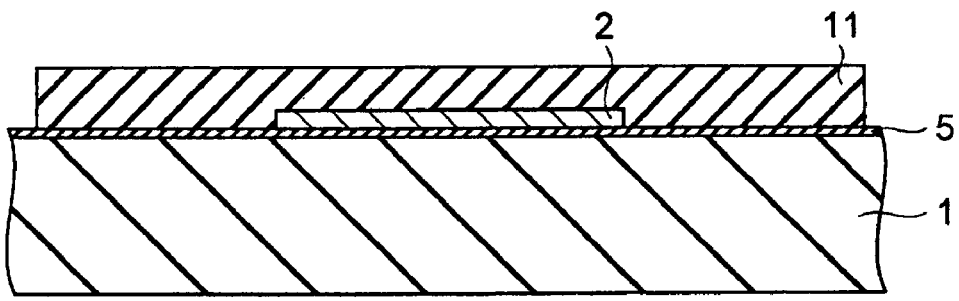
FIG. 11 A sectional view illustrating the method of fabricating the acceleration sensor according to the first embodiment of the invention.

Then, as shown in FIG. 11, by using plasma CVD, a sacrifice layer 11 made of amorphous silicon is formed on the glaze layer 5 so as to cover the ferroelectric layer 2. Here, the sacrifice layer 11 is a layer that is formed based on the assumption that it will be removed in a subsequent process.

Figure 12:
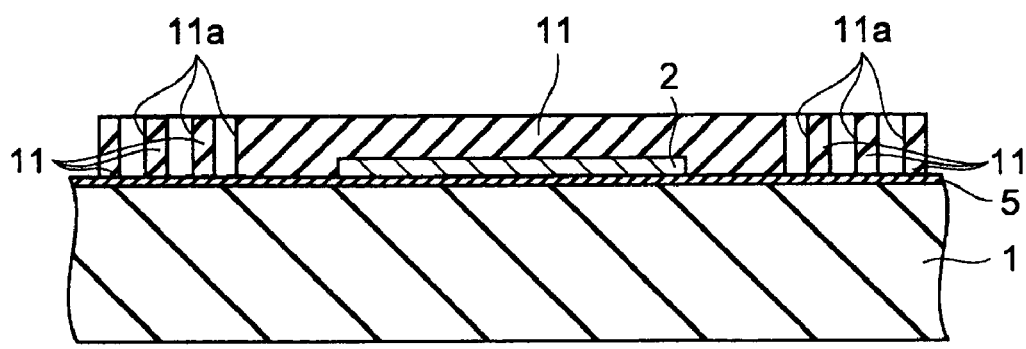
FIG. 12 A sectional view illustrating the method of fabricating the acceleration sensor according to the first embodiment of the invention.
Figure 13:
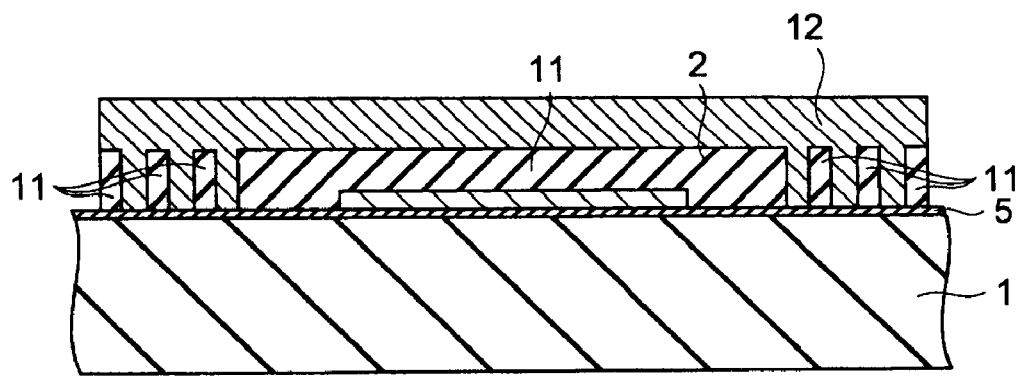
FIG. 13 A sectional view illustrating the method of fabricating the acceleration sensor according to the first embodiment of the invention.

Next, as shown in FIG. 12, by a photolithographic technique and dry etching using $SF_6$ plasma gas, long narrow groove portions (slots) 11a are formed in the sacrifice layer 11. Then, as shown in FIG. 13, on the upper surface of the sacrifice layer 11, a first parylene layer 12 is vapor deposited. In this case, the first parylene layer 12 vapor deposited in the groove portions 11a serves as an anchor portion for holding the proof mass 4.

Figure 14:
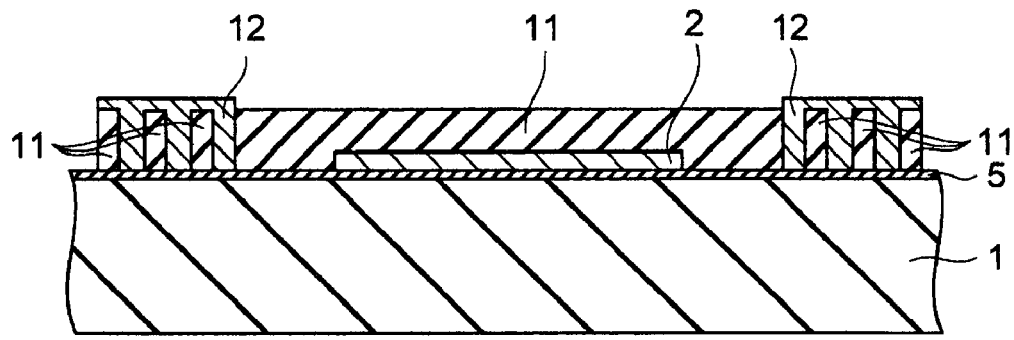
FIG. 14 A sectional view illustrating the method of fabricating the acceleration sensor according to the first embodiment of the invention.

Next, as shown in FIG. 14, by a photolithographic technique and etching using $O_2$ plasma gas, a predetermined area of the first parylene layer 12 is removed.

Figure 15:
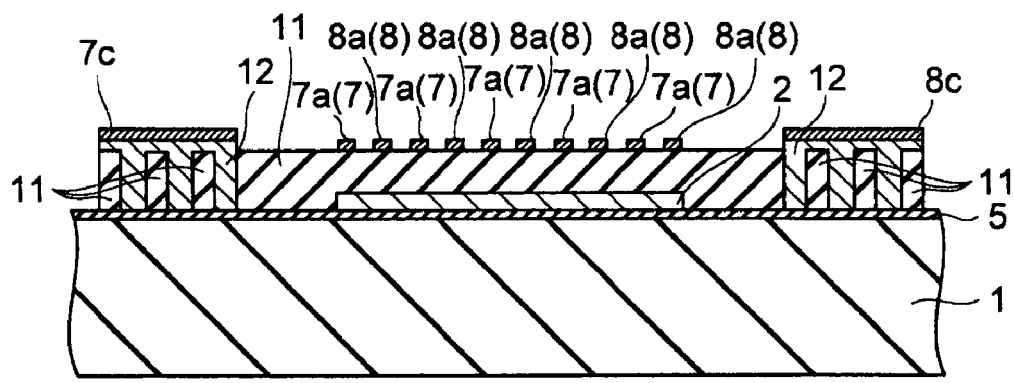
FIG. 15 A sectional view illustrating the method of fabricating the acceleration sensor according to the first embodiment of the invention.

Thereafter, on the sacrifice layer 11 and the first parylene layer 12, by sputtering or a vapor deposition technique, an aluminum layer is deposited, and, as shown in FIG. 15, the deposited aluminum layer is subjected to patterning by using a photolithographic technique and wet etching. As a result, the comb tooth-shaped first electrode 7 and the comb tooth-shaped second electrode 8 as shown in FIG. 5 are formed, and the pad electrodes 7c and 8c electrically connected to the first electrode 7 and the second electrode 8, respectively, are formed. Incidentally, the connection portion 7b (see FIG. 5) connecting between the first electrode 7 and the pad electrode 7c and the connection portion 8b (see FIG. 5) connecting between the second electrode 8 and the pad electrode 8c are formed simultaneously with the patterning of the aluminum layer.

Figure 16:
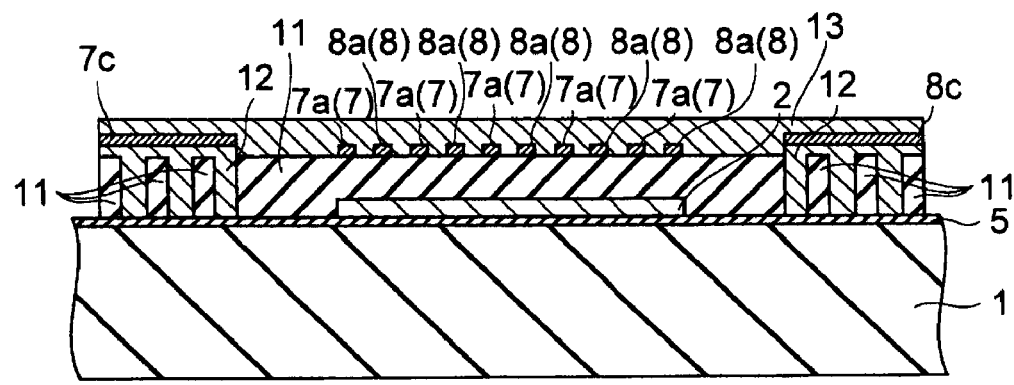
FIG. 16 A sectional view illustrating the method of fabricating the acceleration sensor according to the first embodiment of the invention.
Figure 17:
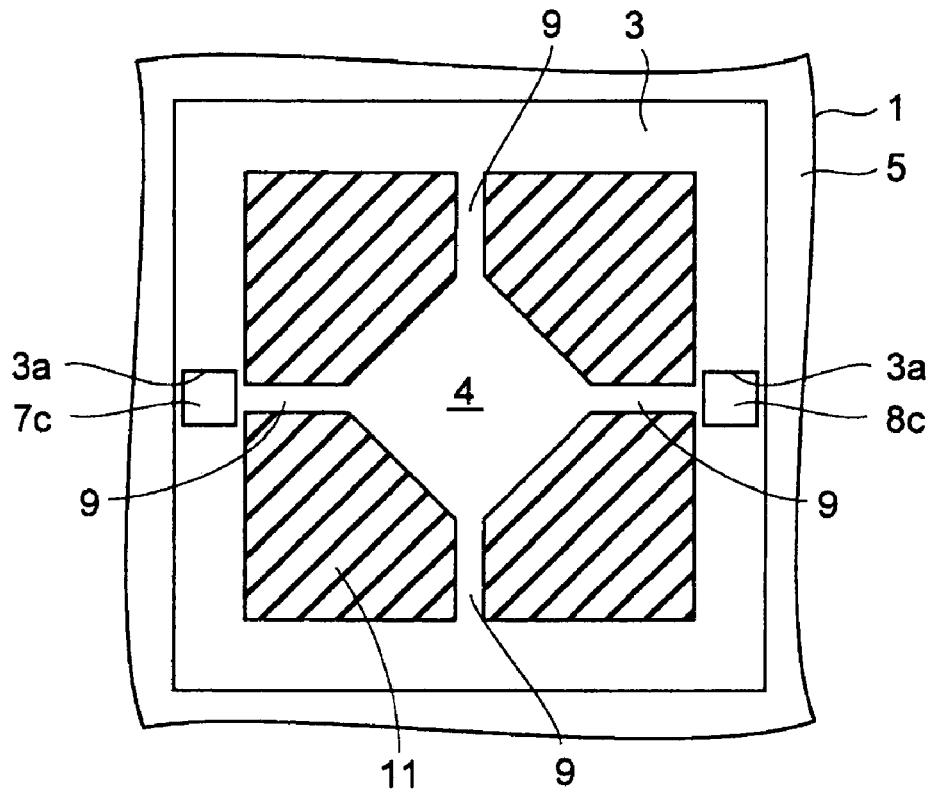
FIG. 17 A sectional view illustrating the method of fabricating the acceleration sensor according to the first embodiment of the invention.
Figure 18:
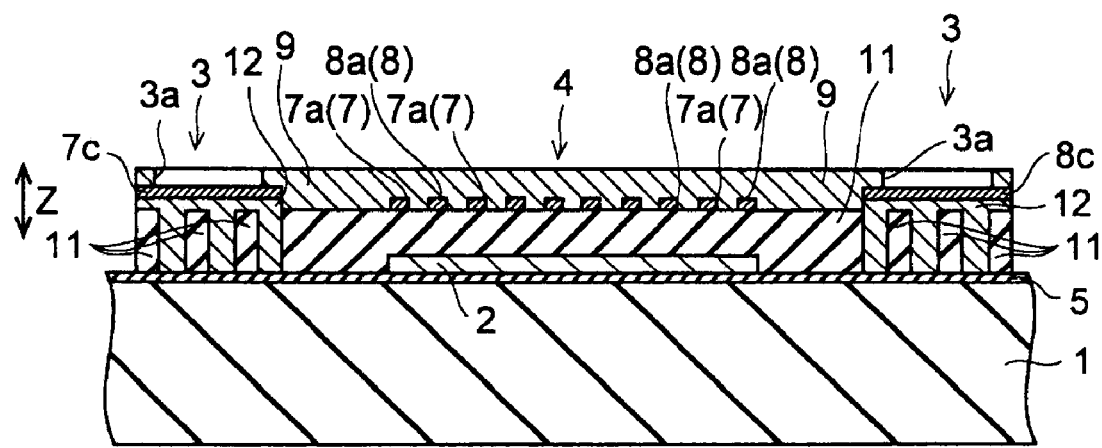
FIG. 18 A sectional view illustrating the method of fabricating the acceleration sensor according to the first embodiment of the invention.

Next, as shown in FIG. 16, a second parylene layer 13 is vapor deposited on the sacrifice layer 11 and the first parylene layer 12 so as to cover the first electrode 7, the second electrode 8, the pad electrodes 7c and 8c, and the connection portions 7b and 8b (see FIG. 5). Then, the second parylene layer 13 is subjected to patterning so as to have a shape as shown in FIG. 17. As a result, the proof mass 4 (see FIG. 1), the beam portions 9 (see FIG. 1), and the frame portion 3 (see FIG. 1), of which all are made of parylene, are formed. At this point, as shown in FIGS. 17 and 18, the openings 3a for exposing the surfaces of the pad electrodes 7c and 8c are formed in a predetermined area of the frame portion 3. Incidentally, the first parylene layer 12 and the second parylene layer 13 can be formed (vapor deposited) at ambient temperature.

Finally, by removing a predetermined area of the sacrifice layer 11 by dry etching using $XeF_2$ gas, a space is left between the proof mass 4 and the ferroelectric layer 2. In this way, the acceleration sensor 50 according to the first embodiment of the invention shown in FIG. 1 is formed.

In the fabrication method of the first embodiment, as described above, by forming the ferroelectric layer 2 made of $BaTiO_3$ in a predetermined area on the ceramic substrate 1 by using screen printing, it is possible to easily form the ferroelectric layer 2 in a predetermined area. This makes it possible to enhance production efficiency as compared with when, for example, a plate-like ferroelectric layer is attached on the substrate. Incidentally, in the acceleration sensor 50 according to the first embodiment, fabrication is possible without using a DRIE process.

In addition, in the first embodiment, by forming the ferroelectric layer 2 made of BaTiO₃ by using screen printing, it is possible to increase the thickness t1 of the ferroelectric layer 2 more easily than when the ferroelectric layer 2 is formed by using sputtering, a sol-gel process, or the like. This helps prevent the possibility that it becomes difficult to detect a change in capacitance value with high accuracy due to a small thickness t1 of the ferroelectric layer 2. This makes it possible to achieve the acceleration sensor 50 having high sensitivity while enhancing production efficiency.

Moreover, in the first embodiment, by forming the wiring layer 6 on the upper surface of the ceramic substrate 1 (the glaze layer 5) by using screen printing, it is possible to form the wiring layer 6 with ease. This also contributes to enhancement of production efficiency.

Second Embodiment

Figure 19:
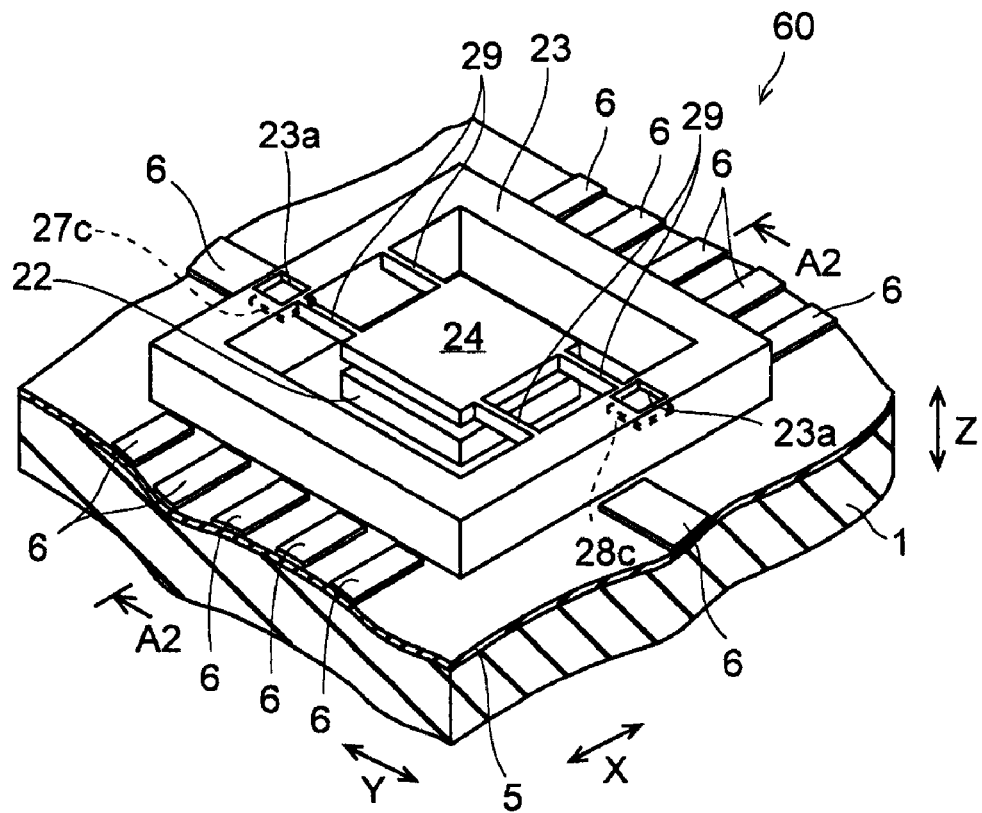
FIG. 19 A perspective view showing the structure of an acceleration sensor according to a second embodiment of the invention.
Figure 20:
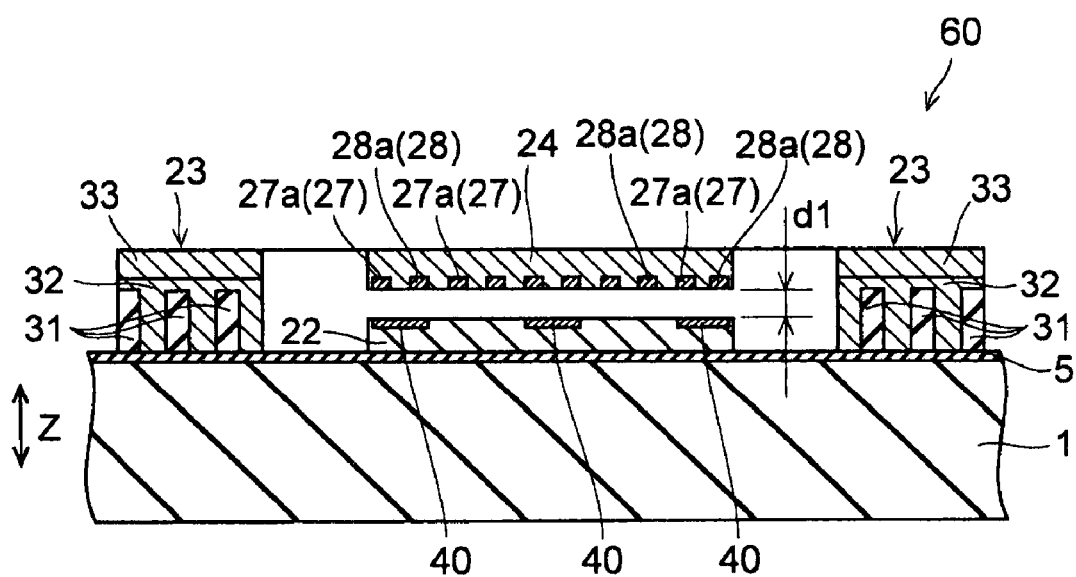
FIG. 20 A sectional view taken on the line A2-A2 of FIG. 19.
Figure 21:
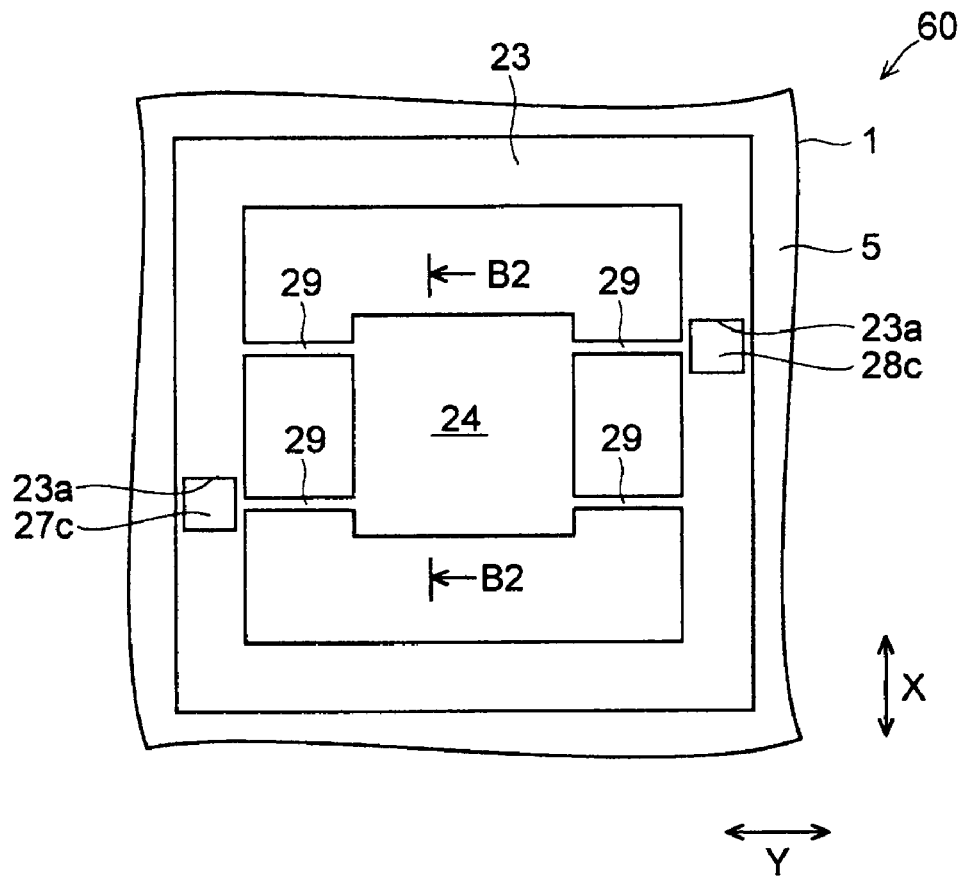
FIG. 21 A plan view of the acceleration sensor according to the second embodiment of the invention.

FIG. 19 is a perspective view showing the structure of an acceleration sensor according to a second embodiment of the invention. FIG. 20 is a sectional view taken on the line A2-A2 of FIG. 19. FIG. 21 is a plan view of the acceleration sensor according to the second embodiment of the invention shown in FIG. 19. FIGS. 22 to 25 are illustrations for explaining the structure of the acceleration sensor according to the second embodiment of the invention. First, with reference to FIGS. 19 to 25, the structure of an acceleration sensor 60 according to the second embodiment of the invention will be described.

The acceleration sensor 60 according to the second embodiment includes, as shown in FIGS. 19 and 20, a ceramic substrate 1, a ferroelectric layer 22 formed on the ceramic substrate 1, a frame portion 23 formed on the ceramic substrate 1 so as to surround the ferroelectric layer 22, and a proof mass 24 placed within the frame portion 23. Incidentally, the ferroelectric layer 22 is an example of a "dielectric layer" of the invention, and the proof mass 24 is an example of a "movable portion" of the invention.

The ceramic substrate 1 is made of Al₂O₃, and has a thickness of approximately 1 mm. On the upper surface of the ceramic substrate 1, as in the first embodiment described above, a glaze layer 5 is formed. Incidentally, the glaze layer 5 is formed for obtaining a smooth surface suitable for formation of the ferroelectric layer 22 or the like. In addition, as shown in FIG. 19, in a predetermined area on the upper surface of the ceramic substrate 1 (the glaze layer 5), the predetermined area located outside the frame portion 23, a wiring layer 6 formed by screen printing is provided. The wiring layer 6 is made of, for example, Au (gold) or the like.

Figure 22:
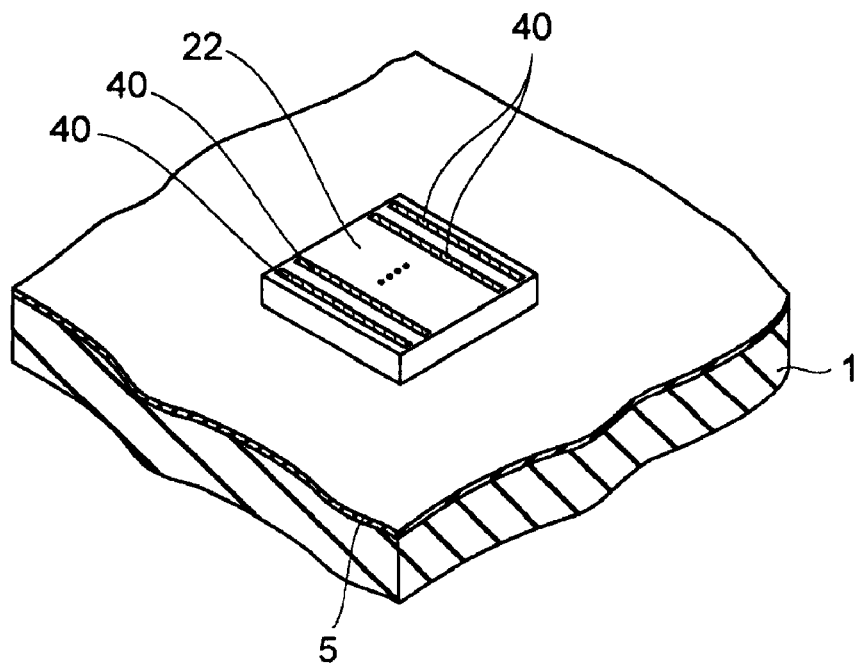
FIG. 22 A perspective view showing the structure of the ferroelectric layer of the acceleration sensor according to the second embodiment of the invention.

Here, in the second embodiment, as in the first embodiment described above, the ferroelectric layer 22 is made of BaTiO₃ (relative permittivity: 1000 or more). In addition, as shown in FIGS. 20 and 22, the ferroelectric layer 22 is formed in a predetermined area on the ceramic substrate 1 (the glaze layer 5) by screen printing. The ferroelectric layer 22 has a substantially quadrangular shape, as seen in a plan view.

In addition, the ferroelectric layer 22 is formed so as to have a thickness of 5 μm or more. Specifically, the ferroelectric layer 22 is formed so as to have a thickness t11 (see FIG. 25) of 5 to 20 μm.

Furthermore, the upper surface of the ferroelectric layer 22 has a surface roughness (not shown) of the order of 0.1 to 0.2 μm, which is formed by controlling the particle size of BaTiO₃. This makes it possible to reduce area of contact between the proof mass 24 and the ferroelectric layer 22, even if the proof mass 24 makes contact with the upper surface of the ferroelectric layer 22. As a result, it is possible to prevent stiction (sticking between the ferroelectric layer 22 and the proof mass 24) effectively. This helps prevent a decrease in the reliability of the acceleration sensor 60 caused by stiction.

In addition, in the second embodiment, as shown in FIGS. 20 and 22, in a predetermined area on the upper surface of the ferroelectric layer 22, a metal layer 40 made of aluminum (Al) is formed. The metal layer 40 has a predetermined pattern, and is formed so as not to protrude from the upper surface of the ferroelectric layer 22. Specifically, the metal layer 40 is formed, as seen in a plan view, so as to extend parallel to comb tooth portions 27a and 28a of a first electrode 27 and a second electrode 28, respectively, which will be described later. Furthermore, the metal layer 40 is so formed that the upper surface thereof is substantially flush with the upper surface of the ferroelectric layer 22.

Moreover, the proof mass 24 is made of parylene (paraxylylene base resin: Parylen), and is formed so as to have a thickness t12 (see FIG. 24) of approximately 5 μm, as shown in FIGS. 20 and 25. In addition, as shown in FIG. 21, the proof mass 24 is formed in a substantially quadrangular shape (approximately 1000 μm per side), as seen in a plan view.

Figure 23:
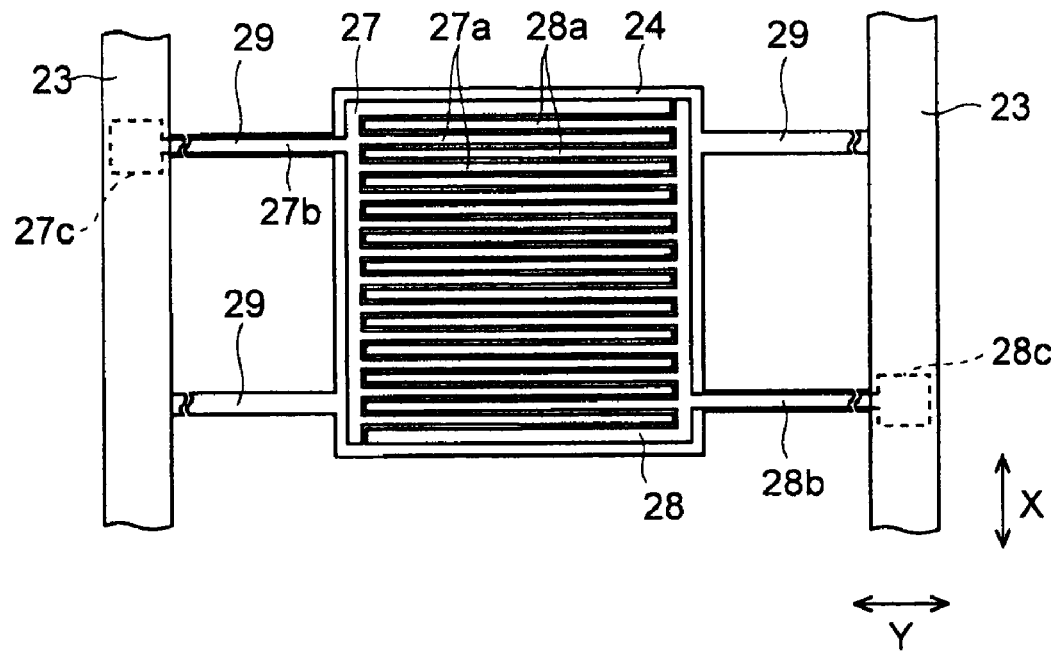
FIG. 23 A plan view of the proof mass, as seen from the reverse side thereof, of the acceleration sensor according to the second embodiment of the invention.

Furthermore, in the second embodiment, as shown in FIG. 23, on the reverse side (lower surface) of the proof mass 24, two electrodes (a first electrode 27 and a second electrode 28) made of aluminum are formed in the same plane so as to lie next to each other. Specifically, the first electrode 27 and the second electrode 28 are formed in the shape of comb teeth, as seen in a plan view, such that comb tooth portions 27a of the first electrode 27 and comb tooth portions 28a of the second electrode 28 are arranged in an alternating manner. In addition, as shown in FIG. 25, a width w1 of each comb tooth portion 27a of the first electrode 27 and a width w1 of each comb tooth portion 28a of the second electrode 28 are approximately 5 μm, and a length g1 from each comb tooth portion 27a of the first electrode 27 to an adjacent comb tooth portion 28a of the second electrode 28 is approximately 5 μm. It is to be noted that, in the acceleration sensor 60 according to the second embodiment, as shown in FIG. 23, the first electrode 27 and the second electrode 28 are formed almost all over the reverse side (lower surface) of the proof mass 24.

In addition, the proof mass 24 includes, as shown in FIGS. 19 and 21, four beam portions 29 that are integrally connected thereto. These four beam portions 29 are provided on a pair of opposite sides of the proof mass 24 such that two beam portions 29 are provided for each side, and are formed so as to extend in the same direction, as seen in a plan view. Moreover, the four beam portions 29 are integrally connected, at the ends thereof, to the frame portion 23. This allows the proof mass 24 to be supported above the ferroelectric layer 22 while facing the ferroelectric layer 22, as shown in FIGS. 19 and 20. Incidentally, a distance d1 (see FIGS. 20 and 25) from the upper surface of the ferroelectric layer 22 to the proof mass 24 (the first electrode 27 and the second electrode 28) is approximately 1 μm.

Figure 24:
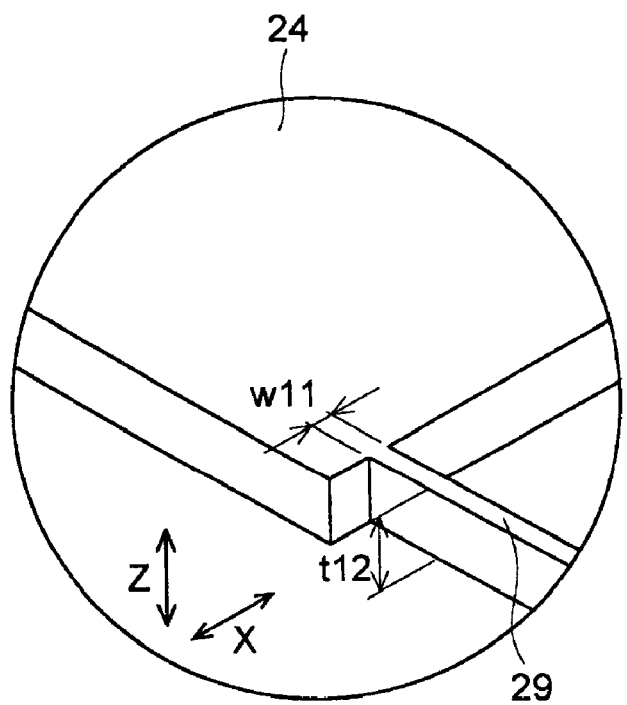
FIG. 24 An enlarged perspective view of the structure of the beam portion in the acceleration sensor according to the second embodiment of the invention.
Figure 25:
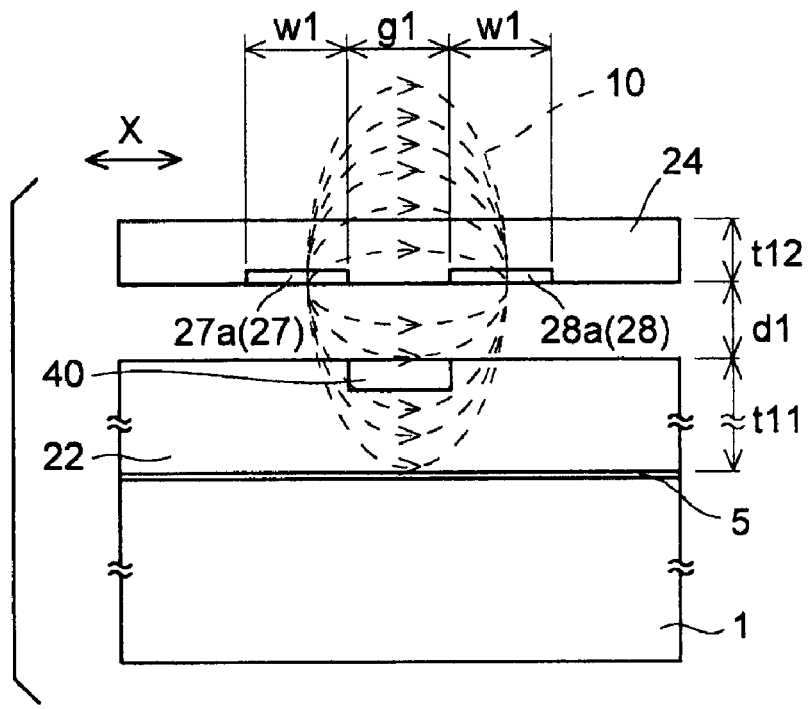
FIG. 25 A sectional view taken on the line B2-B2 of FIG. 21.

Furthermore, in the second embodiment, as shown in FIG. 24, the beam portion 29 has a thickness t12 of approximately 5 μm and a width w11 of approximately 3 μm. That is, the beam portion 29 is made longer in the thickness direction than in the width direction, so as to make it easier for the beam portion 29 to elastically deform in a direction indicated by arrow X, the direction parallel to the upper surface (principal surface) of the ceramic substrate 1 (see FIG. 19). As a result, when the proof mass 24 supported by the four beam portions 29 undergoes acceleration, an inertial force allows the proof mass 24 to move in a horizontal direction indicated by arrow X with respect to the upper surface (principal surface) of the ceramic substrate 1.

In addition, as shown in FIG. 23, the first electrode 27 described above is electrically connected to a pad electrode 27c via a connection portion 27b, and the second electrode 28 described above is electrically connected to a pad electrode 28c via a connection portion 28b.

Furthermore, as shown in FIG. 20, the frame portion 23 has a thickness greater than that of the proof mass 24, and, as shown in FIGS. 19 and 21, has a function of holding the proof mass 24 via the beam portions 29. Incidentally, the frame portion 23 is made primarily of parylene. In addition, in a predetermined area of the frame portion 23, openings 23a for exposing the surfaces of the pad electrodes 27c and 28c are formed.

Other structures of the second embodiment are the same as those of the first embodiment described above.

FIGS. 26 to 32 are illustrations for explaining the operation of the acceleration sensor according to the second embodiment of the invention. Next, with reference to FIG. 23 and FIGS. 25 to 32, the operation of the acceleration sensor 60 according to the second embodiment of the invention will be described.

Figure 26:
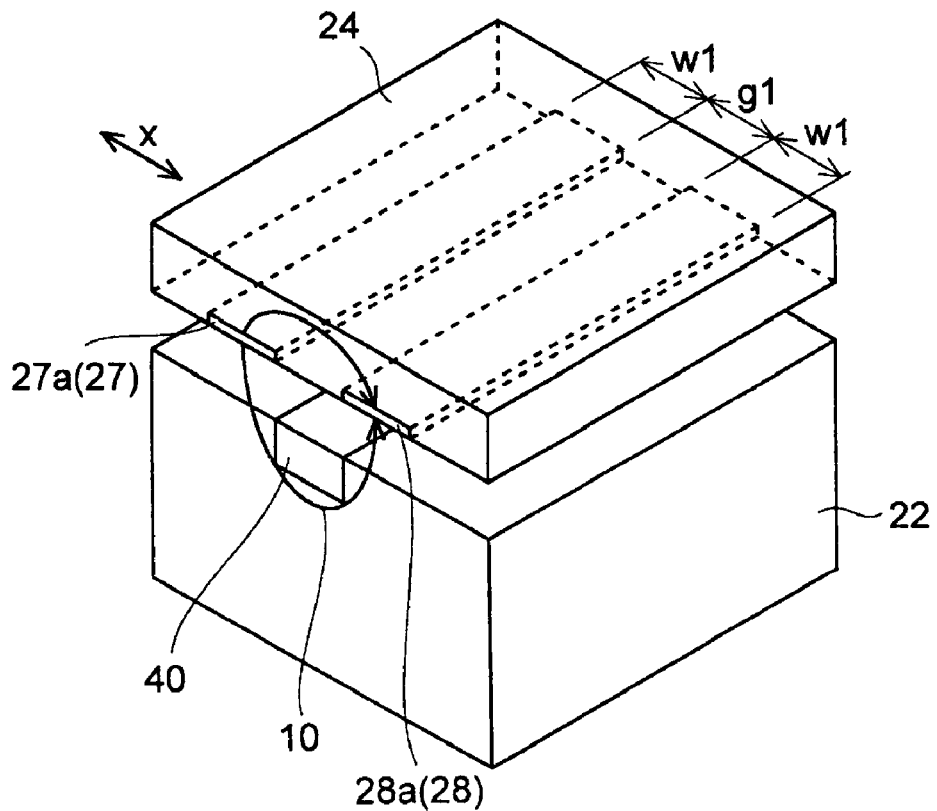
FIG. 26 A perspective view illustrating the operation of the acceleration sensor according to the second embodiment of the invention.

In the acceleration sensor 60 according to the second embodiment, by applying a voltage between the pad electrode 27c (see FIG. 23) and the pad electrode 28c (see FIG. 23), as shown in FIGS. 25 and 26, a fringe field 10 (an electric field generated beside a space between the electrodes) is generated between the comb tooth portions 27a of the first electrode 27 and the comb tooth portions 28a of the second electrode 28. Here, as shown in FIG. 23, since the first electrode 27 and the second electrode 28 generating the fringe field 10 are each formed in the shape of comb teeth, and the comb tooth portions 27a of the first electrode 27 and the comb tooth portions 28a of the second electrode 28 are arranged in an alternating manner, the fringe field 10 is uniformly generated almost all over the reverse side (lower surface) of the proof mass 24. On the other hand, the ferroelectric layer 22 facing the proof mass 24 is located in the fringe field 10 thus generated.

If the acceleration sensor 60 undergoes acceleration in this state, an inertial force acts on the proof mass 24. As a result, the proof mass 24 moves in a horizontal direction, which is a direction indicated by arrow X, with respect to the upper surface of the ceramic substrate 1. In this case, while the lines of electric force of the fringe field 10 generated between the first electrode 27 and the second electrode 28 can pass through the ferroelectric layer 22, they cannot pass through the metal layer 40, causing the appearance of the lines of electric force to change as the proof mass 24 moves in a direction indicated by arrow X. This causes a change in capacitance value with changes in the appearance of the lines of electric force. As a result, by detecting a change in capacitance value, the acceleration the acceleration sensor 60 has undergone in a direction indicated by arrow X is detected.

Figure 27:
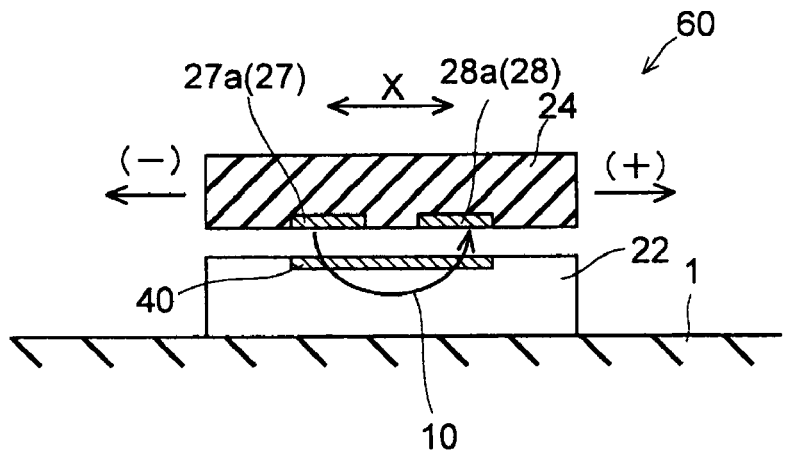
FIG. 27 A sectional view showing a first formation pattern of the metal layer in the acceleration sensor according to the second embodiment of the invention.
Figure 28:
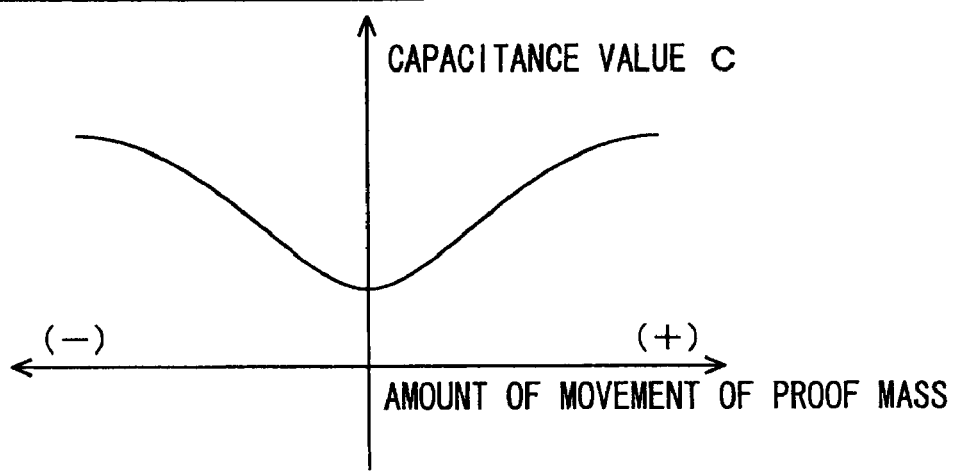
FIG. 28 A graph showing the relationship between the amount of movement of the proof mass and the capacitance value C in the first formation pattern shown in FIG. 27.
Figure 29:
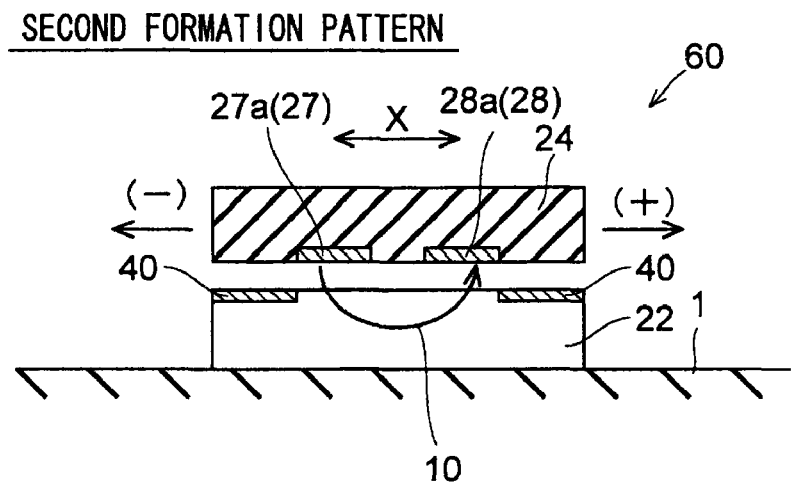
FIG. 29 A sectional view showing a second formation pattern of the metal layer in the acceleration sensor according to the second embodiment of the invention.
Figure 30:
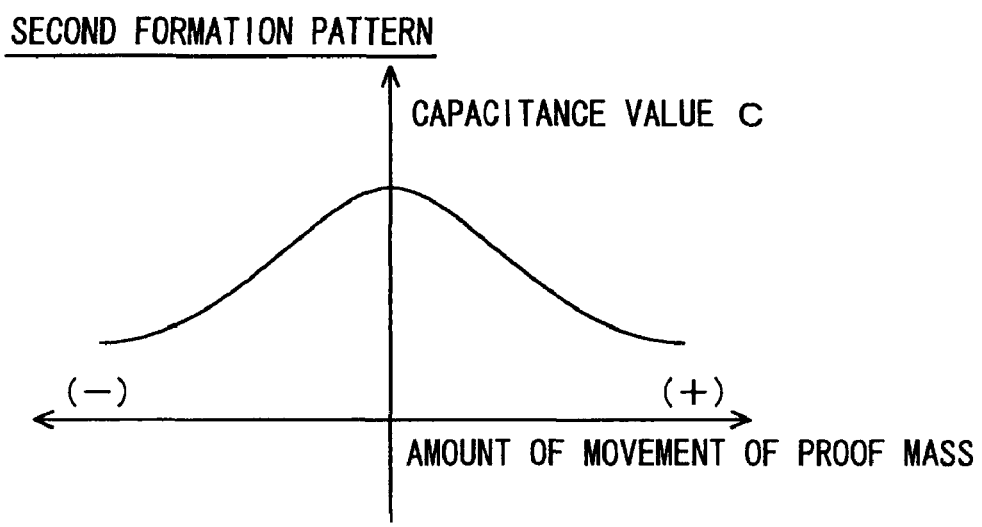
FIG. 30 A graph showing the relationship between the amount of movement of the proof mass and the capacitance value C in the second formation pattern shown in FIG. 29.
Figure 31:
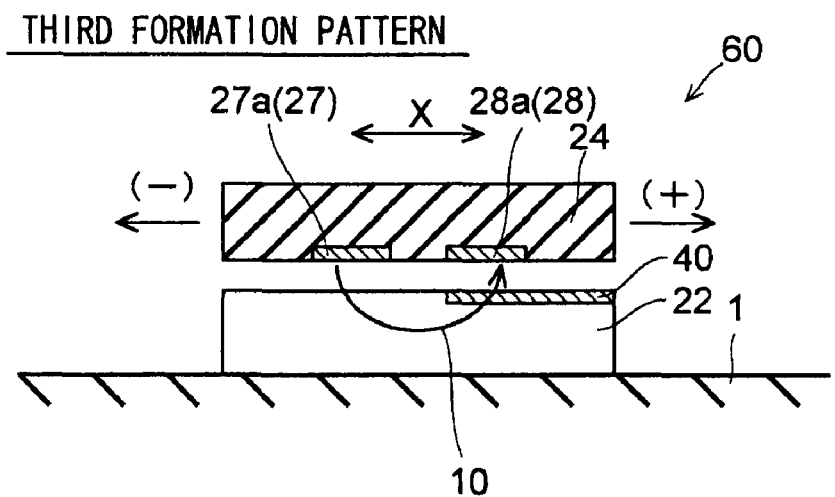
FIG. 31 A sectional view showing a third formation pattern of the metal layer in the acceleration sensor according to the second embodiment of the invention.
Figure 32:
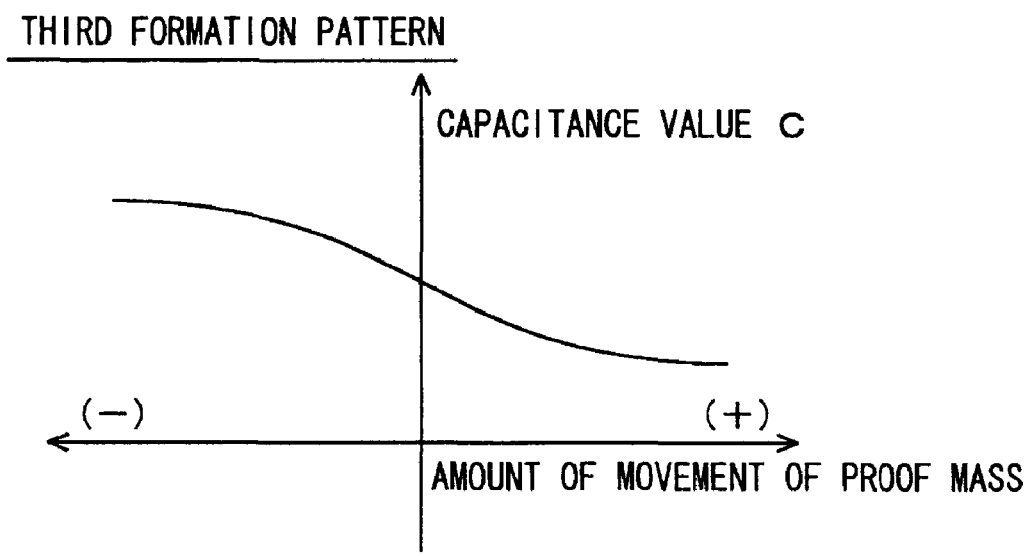
FIG. 32 A graph showing the relationship between the amount of movement of the proof mass and the capacitance value C in the third formation pattern shown in FIG. 31.

Incidentally, the pattern of change in capacitance value is considered to vary depending on the formation pattern of the metal layer 40. For example, as shown in FIG. 27, in a case (a first formation pattern) where the metal layer 40 is formed so as to be located just under both the comb tooth portion 27a of the first electrode 27 and the adjacent comb tooth portion 28a of the second electrode 28, it is easily expected that the capacitance value C changes as shown in FIG. 28. On the other hand, as shown in FIG. 29, in a case (a second formation pattern) where the metal layer 40 is formed so as not to be located just under the comb tooth portion 27a of the first electrode 27 and the comb tooth portion 28a of the second electrode 28, it is easily expected that the capacitance value C changes as shown in FIG. 30. Furthermore, as shown in FIG. 31, in a case (a third formation pattern) where a relatively wide metal layer 40 is formed so as to be located just under one of the comb tooth portion 27a of the first electrode 27 and the comb tooth portion 28a of the second electrode 28, it is easily expected that the capacitance value C changes as shown in FIG. 32. Thus, by changing the formation pattern of the metal layer 40 in various ways, it is possible to adjust the sensitivity with which acceleration is detected.

Next, to evaluate the effectiveness of the acceleration sensor 60 according to the second embodiment, a computer simulation was performed by using a method similar to that described in the first embodiment. The result is shown in FIG. 33.

Figure 33:
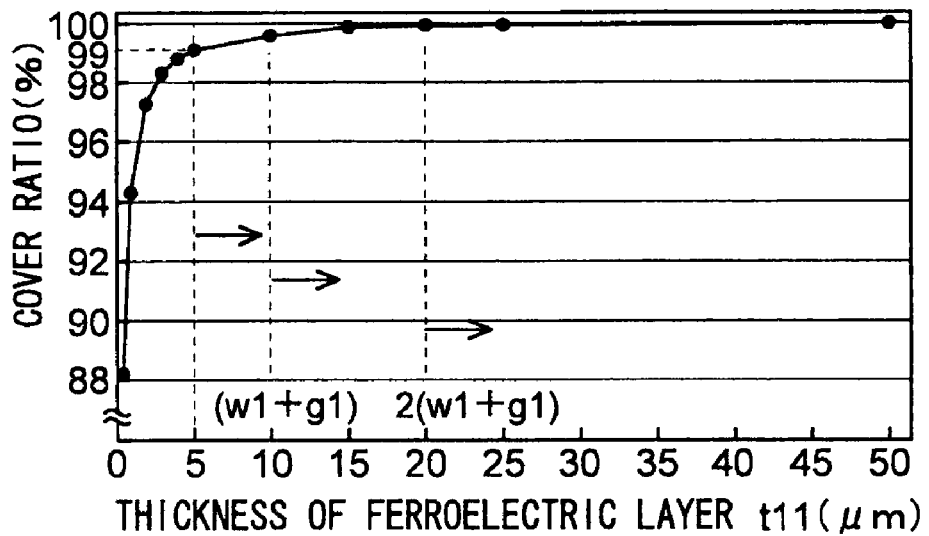
FIG. 33 A graph showing the relationship between the thickness of the ferroelectric layer and the cover ratio.

As shown in FIG. 33, it was found out that a cover ratio of 99% or more can be obtained by making the ferroelectric layer 22 have a thickness t11 of 5 μm or more. It was also found out that a cover ratio of almost 100% (99.8% or more) can be obtained by making the ferroelectric layer 22 have a thickness t11 of 10 μm or more, and a cover ratio of 100% can be obtained by making the ferroelectric layer 22 have a thickness t11 of 20 μm or more. Incidentally, in a case where the thickness t11 of the ferroelectric layer 22 is 10 μm, the thickness t11 of the ferroelectric layer 22 is equal to the total length (w1+g1: approximately 10 μm) of the width w1 (approximately 5 μm) of the comb tooth portion 27a (or 28a) of one of the first electrode 27 and the second electrode 28 and the length g1 (approximately 5 μm) from each comb tooth portion 27a of the first electrode 27 to an adjacent comb tooth portion 28a of the second electrode 28. In a case where the thickness t11 of the ferroelectric layer 22 is 20 μm, the thickness t11 of the ferroelectric layer 22 is equal to twice (2(w1+g1)) of the above-described total length (w1+g1: approximately 10 μma).

As described above, it has been confirmed that, by making the ferroelectric layer 22 have a thickness t11 of 5 μm or more, a sufficient cover ratio can be obtained, and therefore it is possible to detect a change in capacitance value with high accuracy. As a result, it has been confirmed that it is possible to improve the sensitivity with which acceleration is detected.

In the second embodiment, as described above, by forming the first electrode 27 and the second electrode 28 on that side of the proof mass 24 which faces the ferroelectric layer 22, it is possible to generate the fringe field 10 between the comb tooth portion 27a of the first electrode 27 and the comb tooth portion 28a of the second electrode 28. In addition, by forming the metal layer 40 in a predetermined pattern in a predetermined area on the upper surface of the ferroelectric layer 22, even when the proof mass 24 moves in a direction indicated by arrow X, the direction parallel to the upper surface (principal surface) of the ceramic substrate 1, it is possible to change the appearance of the lines of electric force of the fringe field 10. That is, while the lines of electric force of the fringe field 10 generated between the comb tooth portion 27a of the first electrode 27 and the comb tooth portion 28a of the second electrode 28 can pass through the ferroelectric layer 22, they cannot pass through the metal layer 40, and therefore, by forming the metal layer 40 in a predetermined pattern in a predetermined area on the upper surface of the ferroelectric layer 22, it is possible to cause the appearance of the lines of electric force of the fringe field 10 to change as the proof mass 24 moves in a direction indicated by arrow X. As a result, the capacitance value changes with changes in the appearance of the lines of electric force, making it possible to detect acceleration in a direction indicated by arrow X, the direction parallel to the upper surface (principal surface) of the ceramic substrate 1 (the ferroelectric layer 22), by detecting the change in capacitance value.

In addition, in the second embodiment, by forming the metal layer 40 so as not to protrude from the upper surface of the ferroelectric layer 22, even when the metal layer 40 is formed on the upper surface of the ferroelectric layer 22, it is possible to carry on the subsequent fabrication process by the same process as in the case where no metal layer 40 is formed. This helps prevent the possibility that the subsequent fabrication process becomes complicated due to the metal layer 40 protruding from the upper surface of the ferroelectric layer 22. This makes it possible to easily enhance production efficiency.

Moreover, in the second embodiment, by forming the metal layer 40 so as not to protrude from the upper surface of the ferroelectric layer 22, it is possible to prevent the engagement between the metal layer 40 and the proof mass 24 (the first electrode 27, the second electrode 28) as the proof mass 24 moves in a direction indicated by arrow X, the direction parallel to the upper surface (principal surface) of the ceramic substrate 1 (the ferroelectric layer 22). This helps prevent the possibility that the engagement between the metal layer 40 and the proof mass 24 (the first electrode 27, second electrode 28) interferes with the movement of the proof mass 24 in a direction indicated by arrow X, the direction parallel to the upper surface (principal surface) of the ceramic substrate 1 (the ferroelectric layer 22). As a result, it is possible to easily detect acceleration in a direction indicated by arrow X, the direction parallel to the upper surface (principal surface) of the ceramic substrate 1 (the ferroelectric layer 22).

Furthermore, in the second embodiment, by making the ferroelectric layer 22 out of $BaTiO_3$, it is possible to make the relative permittivity of the ferroelectric layer 22 satisfactorily large because $BaTiO_3$ is a metal oxide (ferroelectric material) having a relative permittivity of 1000 or more. This makes it possible to easily detect a change in capacitance value with high accuracy, making it possible to easily detect acceleration in a direction indicated by arrow X, the direction parallel to the upper surface (principal surface) of the ceramic substrate 1 (the ferroelectric layer 22), with high accuracy. Incidentally, since $BaTiO_3$ is a ferroelectric material containing no Pb (lead), by making the ferroelectric layer 22 out of $BaTiO_3$, it is possible to reduce the environmental burden of waste products and their adverse effects on humans.

In addition, in the second embodiment, by making the beam portions 29 supporting the proof mass 24 longer in the thickness direction than in the width direction, it is possible to prevent the proof mass 24 from moving in a vertical direction (a direction indicated by arrow Z) with respect to the upper surface (principal surface) of the ceramic substrate 1 (the ferroelectric layer 22), making it possible to prevent an acceleration component in a direction indicated by arrow Z from being contained in the detected acceleration. This makes it possible to easily detect acceleration in a direction indicated by arrow X, the direction parallel to the upper surface (principal surface) of the ceramic substrate 1 (the ferroelectric layer 22), and to easily improve the accuracy of detection.

Moreover, in the second embodiment, as in the first embodiment described above, by making the ferroelectric layer 22 have a thickness t11 of 5 μm or more, it is possible to obtain a cover ratio of 99% or more. This makes it possible to detect a change in capacitance value with high accuracy. As a result, it is possible to detect acceleration in a direction indicated by arrow X, the direction parallel to the upper surface (principal surface) of the ceramic substrate 1 (the ferroelectric layer 22), with higher accuracy.

Furthermore, in the second embodiment, by forming the glaze layer 5 between the ceramic substrate 1 and the ferroelectric layer 22, it is possible to improve the smoothness of the upper surface of the ferroelectric layer 22. As a result, by controlling the particle size of $BaTiO_3$, it is possible to form a surface roughness of the order of 0.1 to 0.2 μm on the upper surface of the ferroelectric layer 22.

It is to be noted that other effects of the second embodiment are the same as those of the first embodiment described above.

FIGS. 34 to 44 are illustrations for explaining a method of fabricating the acceleration sensor according to the second embodiment of the invention. Next, with reference to FIG. 19, FIGS. 23 to 25, and FIGS. 34 to 44, a method of fabricating the acceleration sensor 60 according to the second embodiment of the invention will be described. Incidentally, the acceleration sensor 60 according to the second embodiment is fabricated by primarily using the surface micromachining technique.

Figure 34:
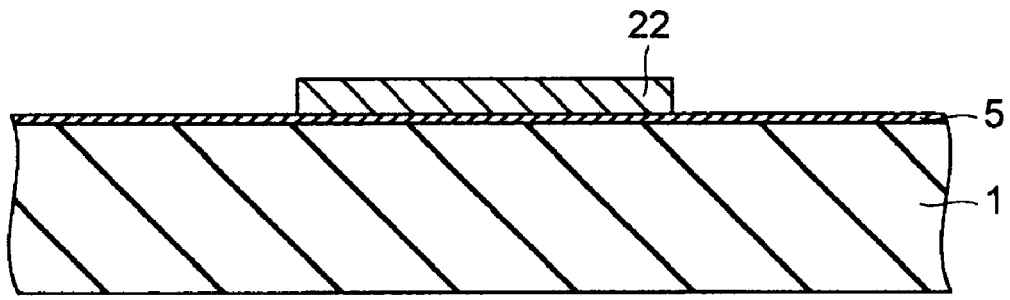
FIG. 34 A sectional view illustrating a method of fabricating the acceleration sensor according to the second embodiment of the invention.

First, as shown in FIG. 34, on the upper surface of the ceramic substrate 1 that has a thickness of approximately 1 mm and is made of $Al_2O_3$, the glaze layer 5 is formed. The glaze layer 5 is formed by, for example, printing a liquid containing glass components on the ceramic substrate 1, and then firing it at a predetermined temperature.

Next, by using screen printing, on the glaze layer 5, the wiring layer 6 shown in FIG. 19 is formed. Incidentally, by forming the wiring layer 6 by screen printing, it is possible to form the wiring layer 6 with ease. This also helps enhance production efficiency.

Then, as shown in FIG. 34, in a predetermined area on the ceramic substrate 1 (the glaze layer 5), the ferroelectric layer 22 is formed by using screen printing. Specifically, after a paste containing $BaTiO_3$ is printed in a predetermined area on the glaze layer 5, the product thus obtained is fired at a firing temperature of the order of 800 to 1200° C. In this way, the ferroelectric layer 22 made of $BaTiO_3$ is formed.

In addition, the ferroelectric layer 22 is formed so as to have a thickness t11 (see FIG. 25) of 5 to 20 μm, and is so formed that the upper surface thereof has a surface roughness (not shown) of the order of 0.1 to 0.2 μm by controlling the particle size of $BaTiO_3$.

Figure 35:
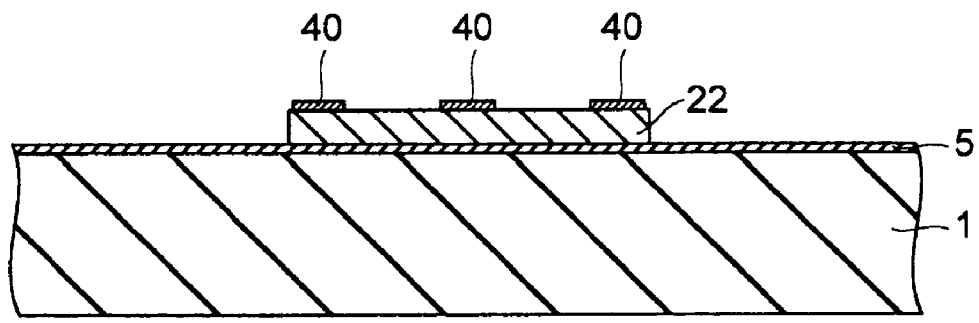
FIG. 35 A sectional view illustrating the method of fabricating the acceleration sensor according to the second embodiment of the invention.
Figure 36:
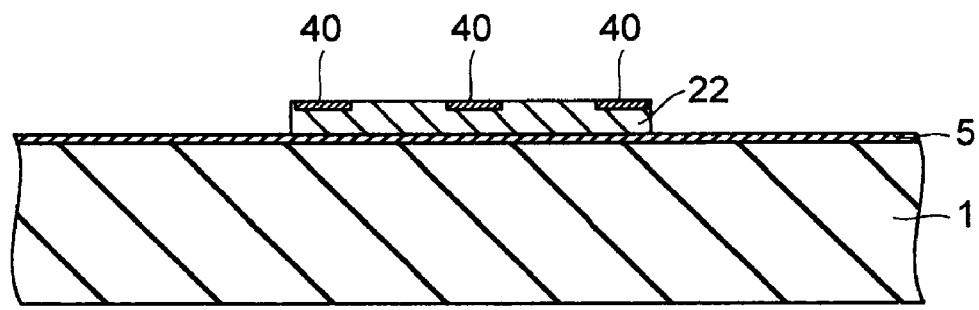
FIG. 36 A sectional view illustrating the method of fabricating the acceleration sensor according to the second embodiment of the invention.

Next, as shown in FIG. 35, by using a vapor deposition technique or the like, in a predetermined area on the ferroelectric layer 22, the metal layer 40 is formed in a predetermined pattern. Then, the ferroelectric layer 22 is softened by raising the temperature to a temperature that is slightly higher than the firing temperature of the ferroelectric layer 22 (for example, by about 50° C.). This causes the metal layer 40 formed on the ferroelectric layer 22 to sink downward. As a result, as shown in FIG. 36, the metal layer 40 is formed so as not to protrude from the upper surface of the ferroelectric layer 22.

Figure 37:
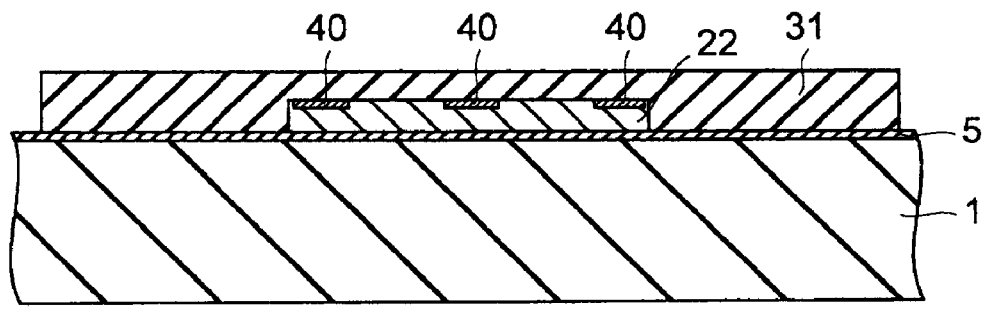
FIG. 37 A sectional view illustrating the method of fabricating the acceleration sensor according to the second embodiment of the invention.

Then, as shown in FIG. 37, by using plasma CVD, a sacrifice layer 31 made of amorphous silicon is formed on the glaze layer 5 so as to cover the ferroelectric layer 22. Here, the sacrifice layer 31 is a layer that is formed based on the assumption that it will be removed in a subsequent process.

Figure 38:
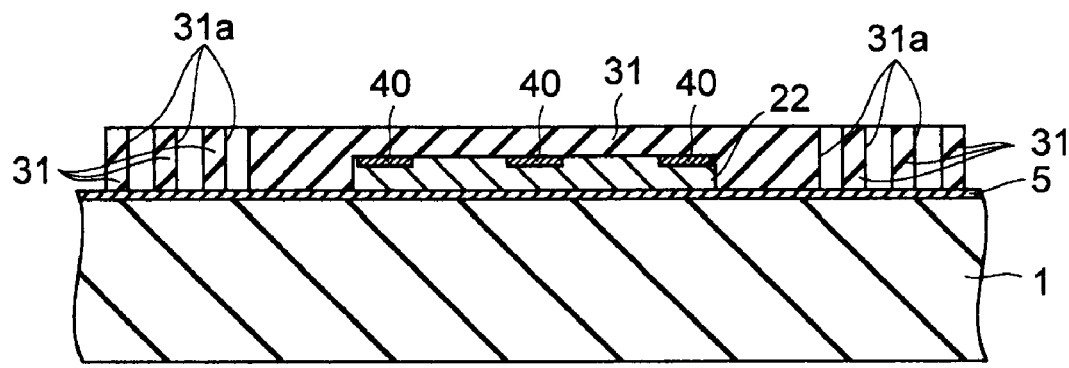
FIG. 38 A sectional view illustrating the method of fabricating the acceleration sensor according to the second embodiment of the invention.
Figure 39:
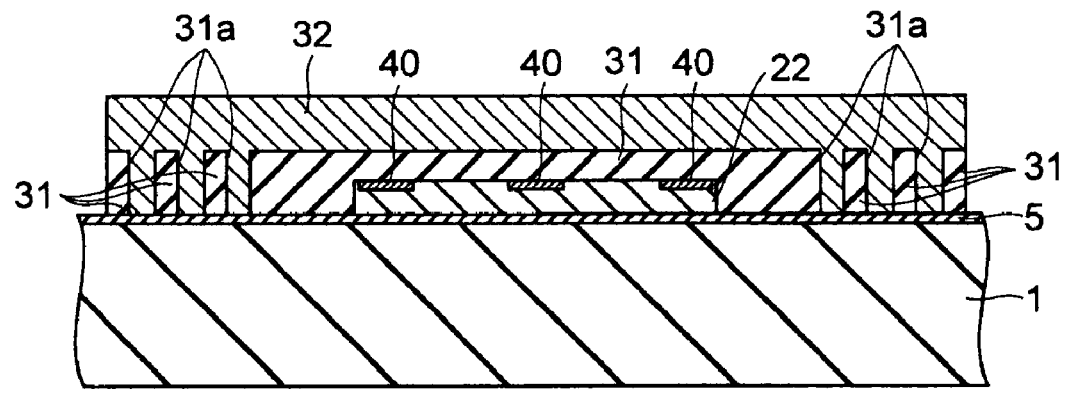
FIG. 39 A sectional view illustrating the method of fabricating the acceleration sensor according to the second embodiment of the invention.

Next, as shown in FIG. 38, by a photolithographic technique and dry etching using $SF_6$ plasma gas, long narrow groove portions (slots) 31a are formed in the sacrifice layer 31. Then, as shown in FIG. 39, on the upper surface of the sacrifice layer 31, a first parylene layer 32 is vapor deposited. In this case, the first parylene layer 32 deposited in the groove portions 31a serves as an anchor portion for holding the proof mass 24.

Figure 40:
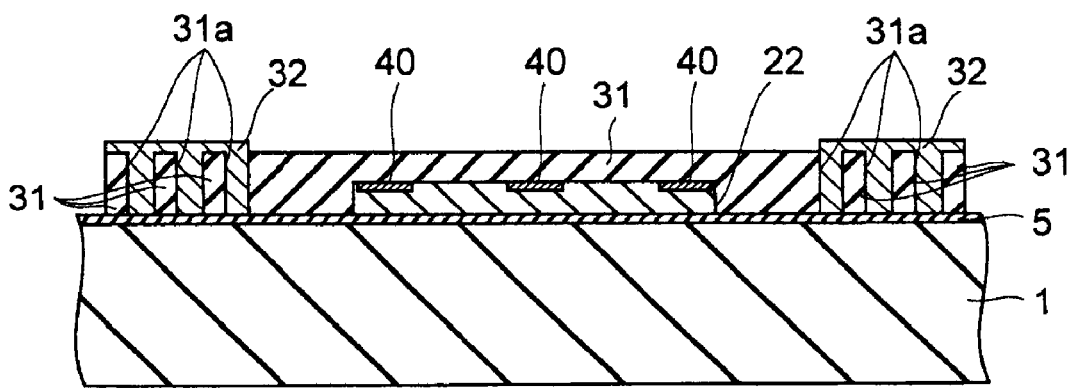
FIG. 40 A sectional view illustrating the method of fabricating the acceleration sensor according to the second embodiment of the invention.

Next, as shown in FIG. 40, by a photolithographic technique and etching using $O_2$ plasma gas, a predetermined area of the first parylene layer 32 is removed.

Figure 41:
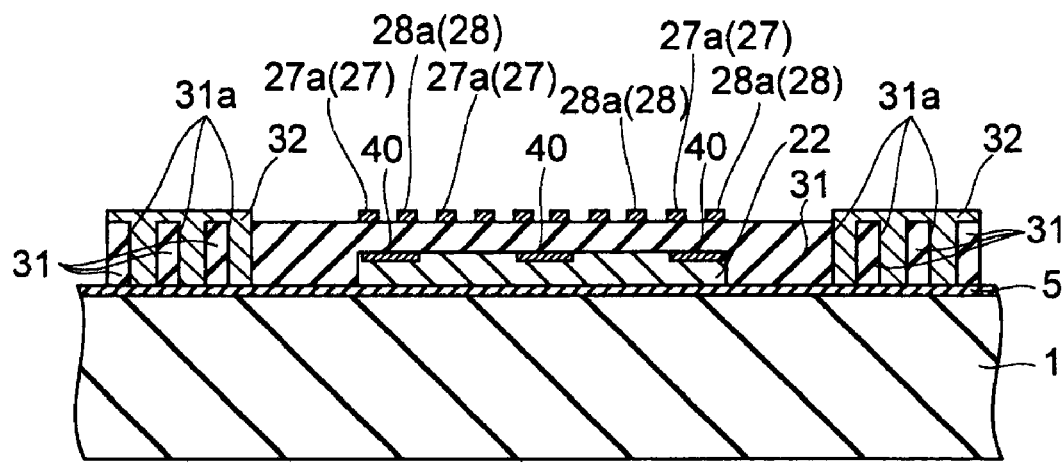
FIG. 41 A sectional view illustrating the method of fabricating the acceleration sensor according to the second embodiment of the invention.

Thereafter, on the sacrifice layer 31 and the first parylene layer 32, by sputtering or a vapor deposition technique, an aluminum layer is deposited, and, as shown in FIG. 41, the deposited aluminum layer is subjected to patterning by using a photolithographic technique and wet etching. As a result, the comb tooth-shaped first electrode 27 and the comb tooth-shaped second electrode 28 as shown in FIG. 23 are formed, and the pad electrodes 27c and 28c electrically connected to the first electrode 27 and the second electrode 28, respectively, are formed. Incidentally, the connection portion 27b (see FIG. 23) connecting between the first electrode 27 and the pad electrode 27c and the connection portion 28b (see FIG. 23) connecting between the second electrode 28 and the pad electrode 28c are formed simultaneously with the patterning of the aluminum layer.

Figure 42:
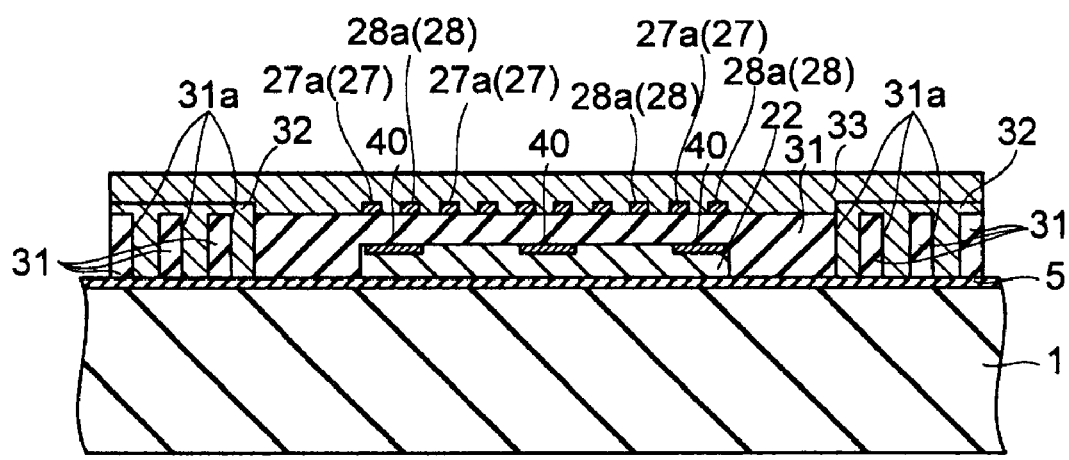
FIG. 42 A sectional view illustrating the method of fabricating the acceleration sensor according to the second embodiment of the invention.
Figure 43:
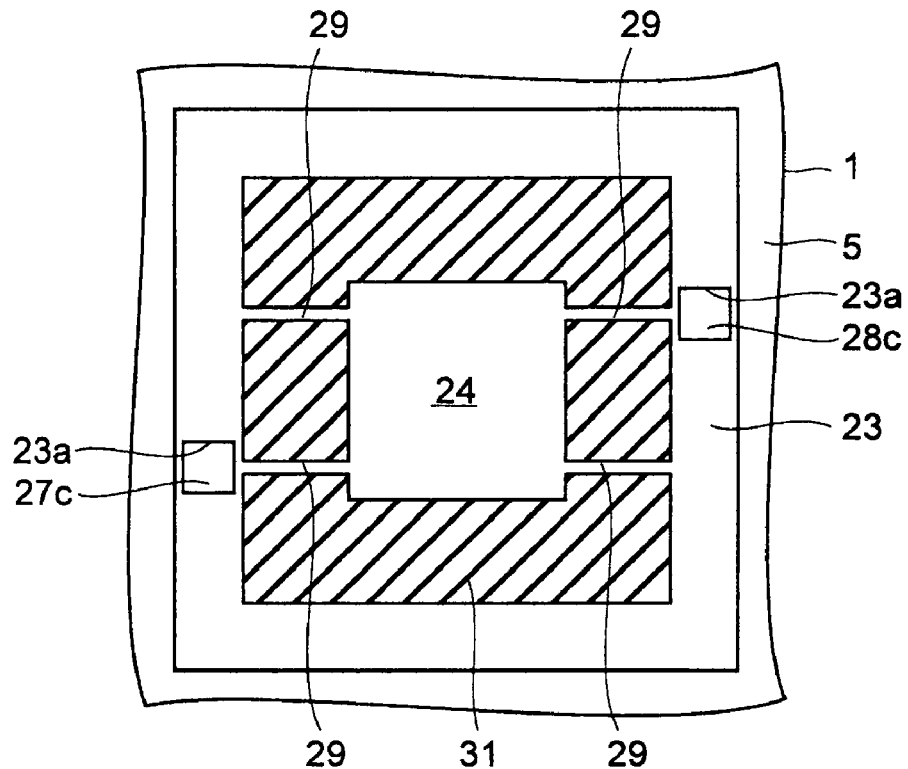
FIG. 43 A sectional view illustrating the method of fabricating the acceleration sensor according to the second embodiment of the invention.

Next, as shown in FIG. 42, a second parylene layer 33 is vapor deposited on the sacrifice layer 31 and the first parylene layer 32 so as to cover the first electrode 27, the second electrode 28, the pad electrodes 27c and 28c (see FIG. 23), and the connection portions 27b and 28b (see FIG. 23). Then, the second parylene layer 33 is subjected to patterning so as to have a shape as shown in FIG. 43. At this point, as shown in FIG. 24, the four beam portions 29 are each made longer in the thickness direction than in the width direction. As a result, the proof mass 24 (see FIG. 19), the beam portions 29 (see FIG. 19), and the frame portion 23 (see FIG. 19), of which all are made of parylene, are formed. At this point, the openings 23a for exposing the surfaces of the pad electrodes 27c and 28c are formed in a predetermined area of the frame portion 23. Incidentally, the first parylene layer 32 and the second parylene layer 33 can be formed (vapor deposited) at ambient temperature.

Figure 44:
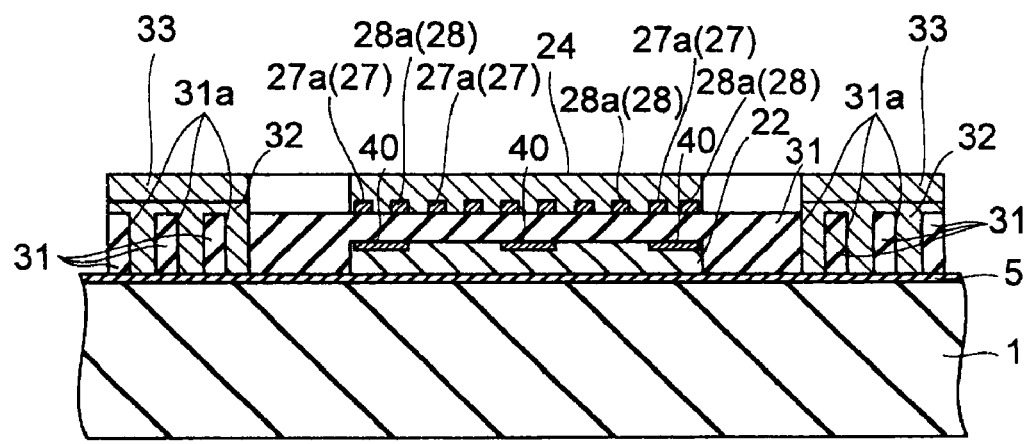
FIG. 44 A sectional view illustrating the method of fabricating the acceleration sensor according to the second embodiment of the invention.

Finally, by removing a predetermined area of the sacrifice layer 31 from the state shown in FIG. 44 by dry etching using $XeF_2$ gas, a space is left between the proof mass 24 and the ferroelectric layer 22. In this way, the acceleration sensor 60 according to the second embodiment of the invention shown in FIG. 19 is formed.

In the second embodiment, as described above, by forming the ferroelectric layer 22 in a predetermined area on the ceramic substrate 1 by using screen printing, it is possible to easily form the ferroelectric layer 22 in a predetermined area on the ceramic substrate 1. This makes it possible to enhance production efficiency as compared with when, for example, a plate-like ferroelectric layer 22 is attached to a predetermined area on the ceramic substrate 1. Incidentally, in the acceleration sensor 60 according to the second embodiment, fabrication is possible without using a DRIE process.

It is to be understood that the embodiments described above are by way of illustration and example only and are not to be taken by way of limitation. The scope of the present invention is not limited to what has been specifically described above, but is recited in the appended claims, and includes any modifications and variations made in the sense and within the scope equivalent to what is recited in the claims.

For example, the above first and second embodiments deal with examples in which the ferroelectric layer is made of $BaTiO_3$. However, the present invention is not limited to those examples, but may be so implemented that the ferroelectric layer is made of a metal oxide other than $BaTiO_3$ as long as the metal oxide has a relative permittivity of 1000 or more and screen printing is applicable thereto. In this case, it is preferable to use a metal oxide containing no Pb (lead).

In addition, the above first and second embodiments deal with examples in which the ferroelectric layer is formed so as to have a thickness of 5 to 20 μm. However, the present invention is not limited to those examples, but may be so implemented that the ferroelectric layer is formed so as to have a thickness of 20 μm or more. Incidentally, as described above, since the formation of the ferroelectric layer is performed by screen printing, it is possible to easily form even a ferroelectric as thick as 20 μm or more.

Moreover, the above first and second embodiments deal with examples in which, on the ceramic substrate having the glaze layer formed thereon, the ferroelectric layer is formed by using screen printing. However, the present invention is not limited to those examples, but may be so implemented that the ferroelectric layer is formed on the ceramic substrate having no glaze layer by using screen printing.

In addition, the above first and second embodiments deal with examples in which the ferroelectric layer is formed by performing firing at a firing temperature of the order of 800 to 1200° C. However, the present invention is not limited to those examples, but may be so implemented that the ferroelectric layer may be formed by performing firing at a firing temperature other than the firing temperature described above. For example, firing may be performed at a relatively high firing temperature of the order of 1200 to 1500° C., or may be performed at a relatively low firing temperature of 700° C. or lower. Incidentally, in a case where firing is performed at a firing temperature of the order of 1200 to 1500° C., the acceleration sensors described in the above embodiments can be fabricated by forming the ferroelectric layer on the ceramic substrate having no glaze layer, and forming the wiring layer after formation of the ferroelectric layer. In addition, in a case where firing is performed at a firing temperature of 700° C. or lower, it is preferable that the ferroelectric layer be formed so as not to have a relative permittivity of 1000 or less.

Moreover, the above first and second embodiments deal with examples in which the ceramic substrate made of $Al_2O_3$ is used. However, the present invention is not limited to those examples, but may be so implemented that the acceleration sensor is fabricated by using a ceramic substrate made of a ceramic material other than $Al_2O_3$.

Furthermore, the above first and second embodiments deal with examples in which the proof mass is held by the frame portion. However, the present invention is not limited to those examples, but may be so implemented that the proof mass is held by a member other than the frame portion.

Incidentally, in the above first and second embodiments, the proof mass may be provided with a plurality of via holes that are formed so as to pass through the proof mass from the upper surface thereof to the lower surface thereof. This structure makes it easier to remove the sacrifice layer, and makes it possible to reduce air resistance.

In addition, the above second embodiment deals with an example in which the metal layer is formed so as not to protrude from the upper surface of the ferroelectric layer. However, the present invention is not limited to this example, but may be so implemented that the metal layer is formed so as to protrude from the upper surface of the ferroelectric layer.

Moreover, the above second embodiment deals with, as examples of the formation pattern of the metal layer, three formation patterns: the first formation pattern, the second formation pattern, and the third formation pattern. However, the present invention is not limited to those examples. The formation pattern of the metal layer may be a formation pattern other than the above-described first formation pattern, second formation pattern, and third formation pattern. Furthermore, two or more of the formation patterns of the metal layer may be used in combination. As described above, in a case where two or more of the formation patterns of the metal layer are used in combination, it becomes possible to adjust the sensitivity with which acceleration is detected, and to improve the detection sensitivity.

In addition, the above second embodiment deals with an example in which the metal layer is made of aluminum. However, the present invention is not limited to this example, but may be so implemented that the metal layer is made of a metal other than aluminum.

Figure 45:
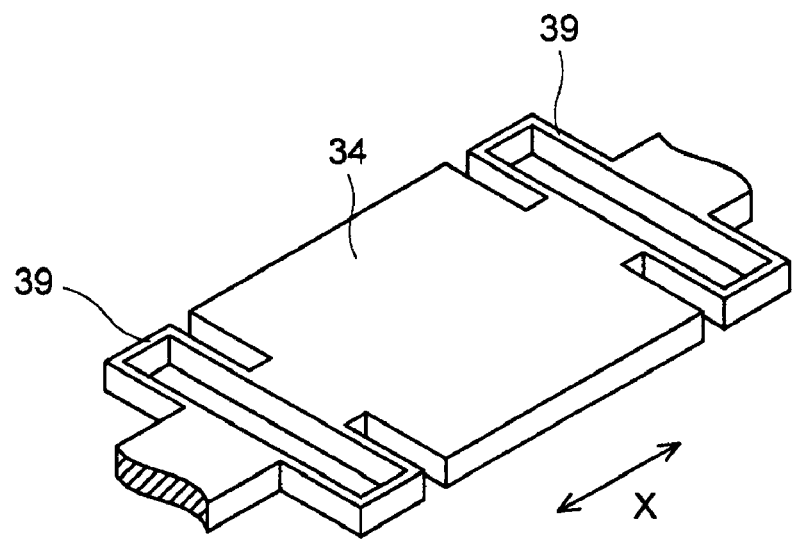
FIG. 45 A perspective view showing the structure of a proof mass and a beam portion of an acceleration sensor according to Modified Example 1 of the invention.

Furthermore, the above second embodiment deals with a structure in which the proof mass is supported by the four beam portions. However, the present invention is not limited to this structure. The beam portion that supports the proof mass may be structured in any other way than is specifically described above as an embodiment as long as it is possible to move the proof mass in a predetermined direction, the direction parallel to the upper surface of the ceramic substrate. For example, as shown in FIG. 45, beam portions 39 that support a proof mass 34 may be so structured as to bow in a direction indicated by arrow X.

Figure 46:
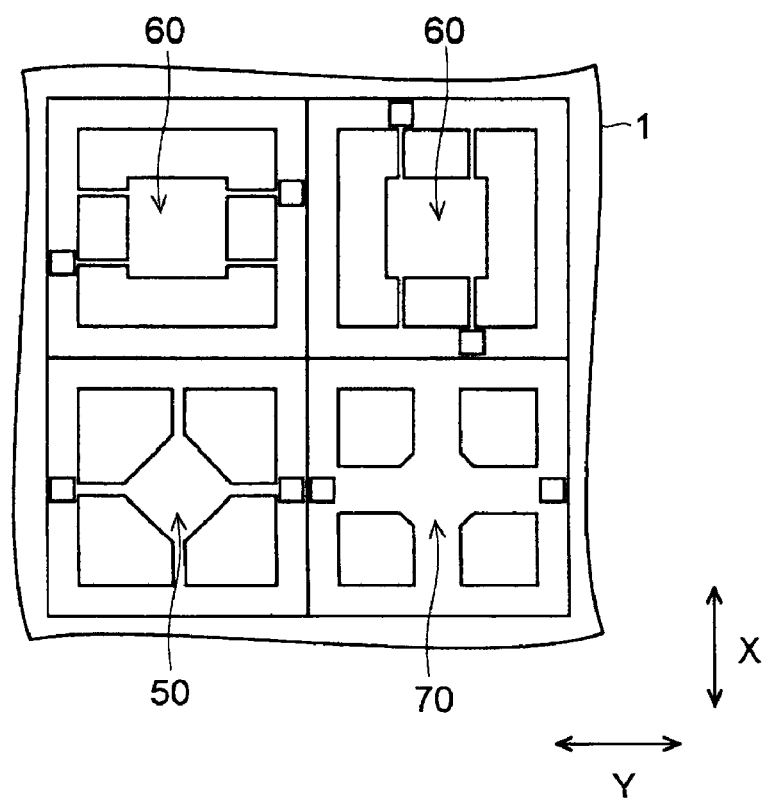
FIG. 46 A plan view showing the structure of an acceleration sensor according to Modified Example 2 of the invention.
Figure 47:
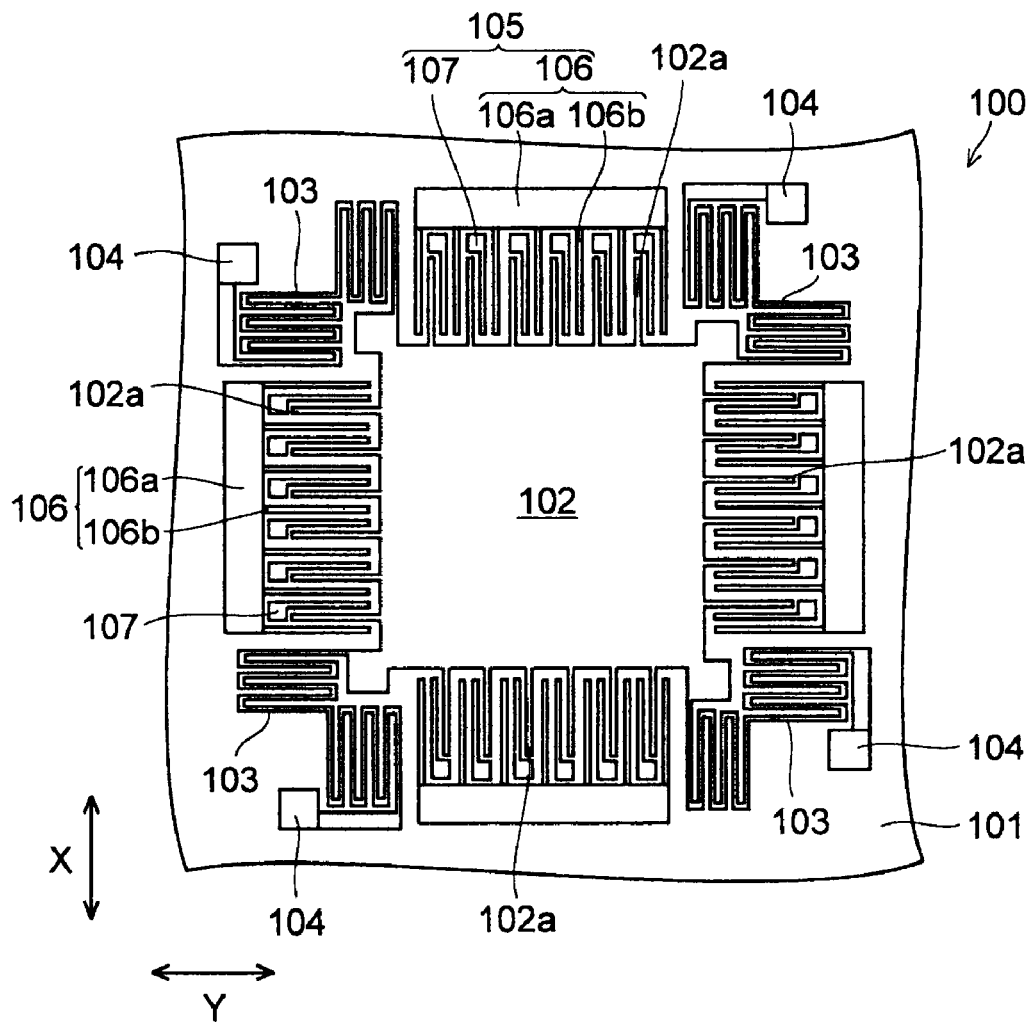
FIG. 47 A plan view showing an example of a conventional acceleration sensor.
Figure 48:
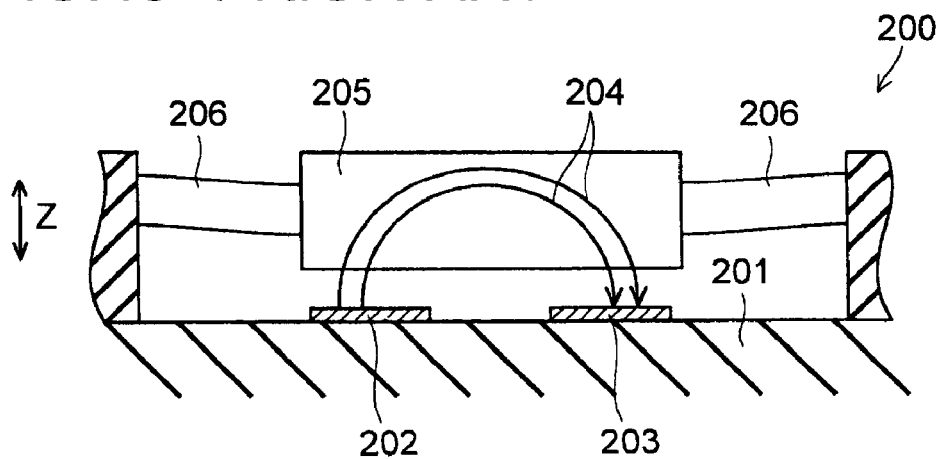
FIG. 48 A schematic sectional view showing the structure of a conventional acceleration sensor proposed in Non-Patent Document 1.

Moreover, the above second embodiment deals with an example in which the acceleration sensor is structured so that acceleration in a direction indicated by arrow X, the direction parallel to the upper surface of the ceramic substrate, can be detected. However, the present invention is not limited to this example, but may be so implemented that acceleration in multiple directions can be detected simultaneously by forming a plurality of acceleration sensors on a single ceramic substrate. For example, as shown in FIG. 46, two acceleration sensors 60 that detect acceleration in different directions indicated by arrows X and Y, the directions parallel to the upper surface of a ceramic substrate 1, and an acceleration sensor 50 that detects acceleration in a vertical direction with respect to the upper surface of the ceramic substrate 1 may be at least formed on the single ceramic substrate 1, such that acceleration in three axial directions can be detected simultaneously. In addition, as shown in FIG. 46, an acceleration sensor 70 having a proof mass that does not move may be further provided as a reference. This structure makes it possible to further improve the accuracy with which acceleration is detected.

What is claimed is:

1. An acceleration sensor comprising:
a ceramic substrate;
a metal oxide dielectric layer formed in a predetermined area on the ceramic substrate by screen printing;
a movable portion disposed so as to face the dielectric layer, the movable portion being formed at a predetermined distance from the dielectric layer; and
a first electrode and a second electrode on that side of the movable portion which faces the dielectric layer.

2. An acceleration sensor comprising:
a ceramic substrate;
a metal oxide dielectric layer formed in a predetermined area on the ceramic substrate by screen printing;
a movable portion disposed so as to face the dielectric layer, the movable portion being formed at a predetermined distance from the dielectric layer; and
a first electrode and a second electrode on that side of the movable portion which faces the dielectric layer,
wherein a metal layer is formed in a predetermined area on an upper surface of the dielectric layer.

3. The acceleration sensor as claimed in claim 2, wherein the metal layer does not protrude from an upper surface of the dielectric layer.

4. The acceleration sensor as claimed in any one of claim 1 to 3, wherein the dielectric layer comprises $BaTiO_3$.

5. The acceleration sensor as claimed in any one of claim 1 to 3, wherein the ceramic substrate comprises $Al_2O_3$.

6. The acceleration sensor as claimed in any one of claim 1 to 3, wherein each of the first electrode and the second electrode has a shape of comb teeth having a plurality of comb tooth portions, and, as seen in a plan view, the comb tooth portions thereof are arranged at predetermined intervals in an alternating manner.

7. The acceleration sensor as claimed in any one of claim 1 to 3, wherein the dielectric layer has a thickness of 5 μm or more.

8. The acceleration sensor as claimed in any one of claim 1 to 3, including a glaze layer between the ceramic substrate and the dielectric layer.

9. The acceleration sensor as claimed in claim 2 or 3, further comprising:
a beam portion supporting the movable portion,
wherein the beam portion is longer in a thickness direction than in a width direction.

10. A method of fabricating an acceleration sensor, comprising:
forming a dielectric layer made of a metal oxide in a predetermined area on a ceramic substrate by using screen printing;
forming a first electrode and a second electrode so as to be located above the dielectric layer; and
forming a movable portion above the dielectric layer so as to face the dielectric layer, wherein the first electrode and the second electrode are fixed to the movable portion.

11. The method of fabricating an acceleration sensor as claimed in claim 10, wherein forming the dielectric layer includes making the dielectric layer out of $BaTiO_3$.

12. The method of fabricating an acceleration sensor as claimed in claim 10 or 11, wherein forming the first electrode and the second electrode includes forming each of the first electrode and the second electrode in a shape of comb teeth having a plurality of comb tooth portions, and arranging, as seen in a plan view, the comb tooth portions thereof at predetermined intervals in an alternating manner.

13. The method of fabricating an acceleration sensor as claimed in claim 10 or 11, further comprising:
forming a wiring layer on a surface of the ceramic substrate by screen printing.

* * * * *